(12) United States Patent
Collins et al.

(10) Patent No.: US 9,676,045 B2
(45) Date of Patent: Jun. 13, 2017

(54) ELECTRODES, COMPONENTS, APPARATUSES, AND METHODS FOR BURR-FREE OR SUBSTANTIALLY BURR-FREE ELECTROCHEMICAL MACHINING

(75) Inventors: Terry George Collins, Litchfield Park, AZ (US); Dominick John Forenz, Hammondsport, NY (US); Mark Lee Humphrey, Elmira, NY (US)

(73) Assignee: Corning Optical Communications RF LLC, Glendale, AZ (US)

( * ) Notice: Subject to any disclaimer, the term of this patent is extended or adjusted under 35 U.S.C. 154(b) by 252 days.

(21) Appl. No.: 13/405,574

(22) Filed: Feb. 27, 2012

(65) Prior Publication Data

US 2012/0217163 A1   Aug. 30, 2012

Related U.S. Application Data

(60) Provisional application No. 61/447,549, filed on Feb. 28, 2011.

(51) Int. Cl.
| | |
|---|---|
| *B23H 3/04* | (2006.01) |
| *B23H 9/00* | (2006.01) |
| *C25D 17/00* | (2006.01) |

(52) U.S. Cl.
CPC ............ *B23H 3/04* (2013.01); *B23H 9/00* (2013.01); *B23H 2300/10* (2013.01)

(58) Field of Classification Search
CPC ......... B23H 9/00; B23H 3/04; B23H 2300/10
USPC ...................................................... 204/224 R
See application file for complete search history.

(56) References Cited

U.S. PATENT DOCUMENTS

| | | | | |
|---|---|---|---|---|
| 3,420,759 A | * | 1/1969 | Inoue | B23H 5/02 204/294 |
| 3,489,671 A | * | 1/1970 | Muller et al. | 204/284 |
| 4,213,834 A | * | 7/1980 | Semashko et al. | 205/642 |
| 4,339,319 A | * | 7/1982 | Aigo | 204/224 R |
| 6,310,312 B1 | * | 10/2001 | Higuerey | B23H 1/00 219/69.11 |

(Continued)

OTHER PUBLICATIONS

Benedict, Gary. *Nontraditional Manufacturing Processes.* 1987, New York, New York: Marcel Dekker, Inc.

(Continued)

*Primary Examiner* — Stefanie S Wittenberg
(74) *Attorney, Agent, or Firm* — Harness, Dickey & Pierce, PLC

(57) ABSTRACT

Electrodes, components, apparatuses, and methods for electrochemical machining (ECM) are disclosed. ECM may be employed to provide burr-free or substantially burr-free ECM of electrically-conductive workpieces (e.g. shrouds). As one non-limiting example, the electrically-conductive workpiece may be a shroud that is used as an electrical component in electronics boards. While the ECM components, apparatuses, and methods disclosed herein reduce burrs, ECM can provide imprecise machining and cause stray erosions to occur in the machined electrically-conductive workpiece. In this regard, the electrodes, components, apparatuses, and methods for ECM disclosed herein provide features that allow for precise machining of the machined electrically-conductive workpiece and also allow avoidance of stray erosions in the machined electrically-conductive workpiece.

18 Claims, 24 Drawing Sheets

(56) References Cited

U.S. PATENT DOCUMENTS

| | | | |
|---|---|---|---|
| 6,539,574 B2 | 4/2003 | Payne et al. | 15/160 |
| 6,682,181 B1 | 1/2004 | Moynihan et al. | 347/71 |
| 6,684,480 B2 | 2/2004 | Conrad | 29/558 |
| 6,835,299 B1 * | 12/2004 | Tchugunov | 205/654 |
| 6,939,205 B2 | 9/2005 | Hopf et al. | 451/38 |
| 7,003,880 B2 | 2/2006 | Morita | 29/890.142 |
| 7,023,564 B2 | 4/2006 | Jagiella et al. | 356/614 |
| 7,637,800 B2 | 12/2009 | Hamann et al. | 451/36 |
| 2003/0226764 A1 * | 12/2003 | Moore et al. | 205/640 |
| 2010/0051475 A1 * | 3/2010 | Eto | B23H 3/04 205/674 |
| 2011/0290654 A1 * | 12/2011 | Weiner et al. | 205/170 |

OTHER PUBLICATIONS

Weller, E.J. *Nontraditional Machining Processes*, $2^{nd}$ ed., 1984, Dearborn, Michigan: Society of Manufacturing Engineers.

\* cited by examiner

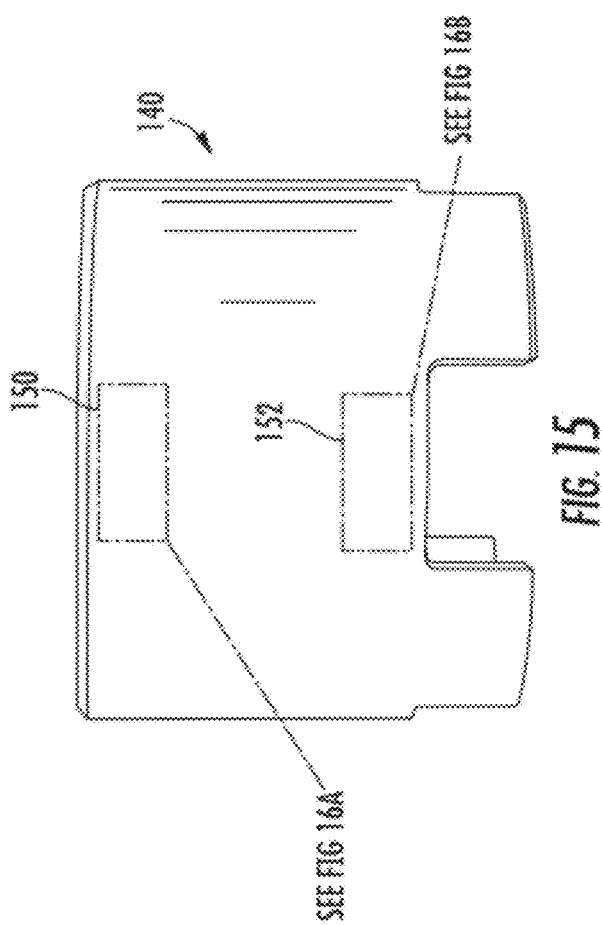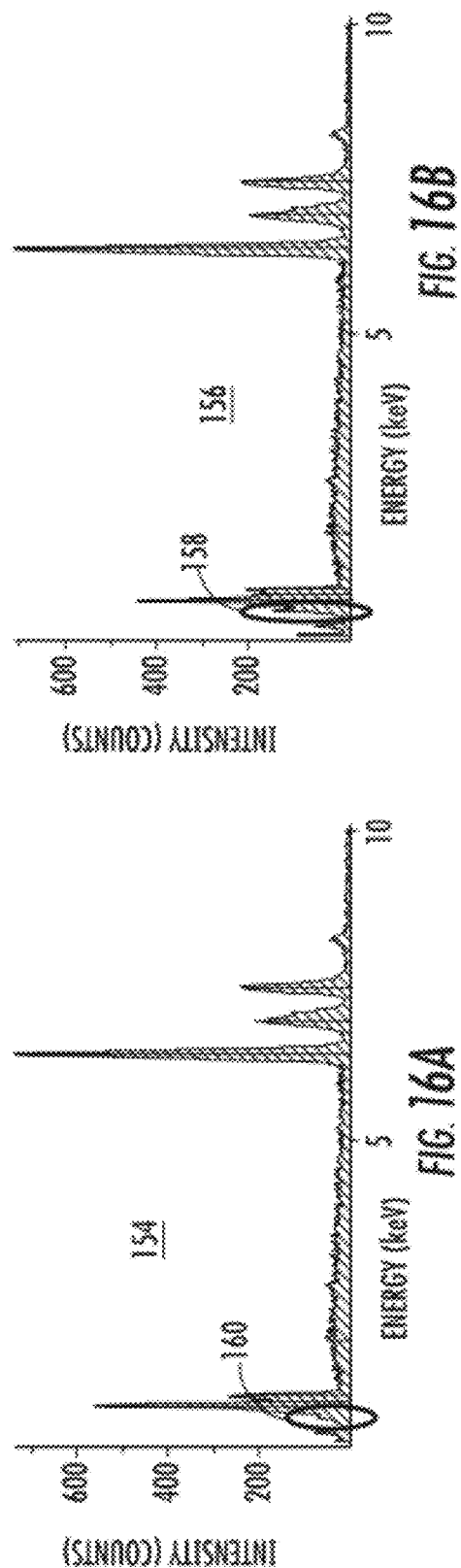

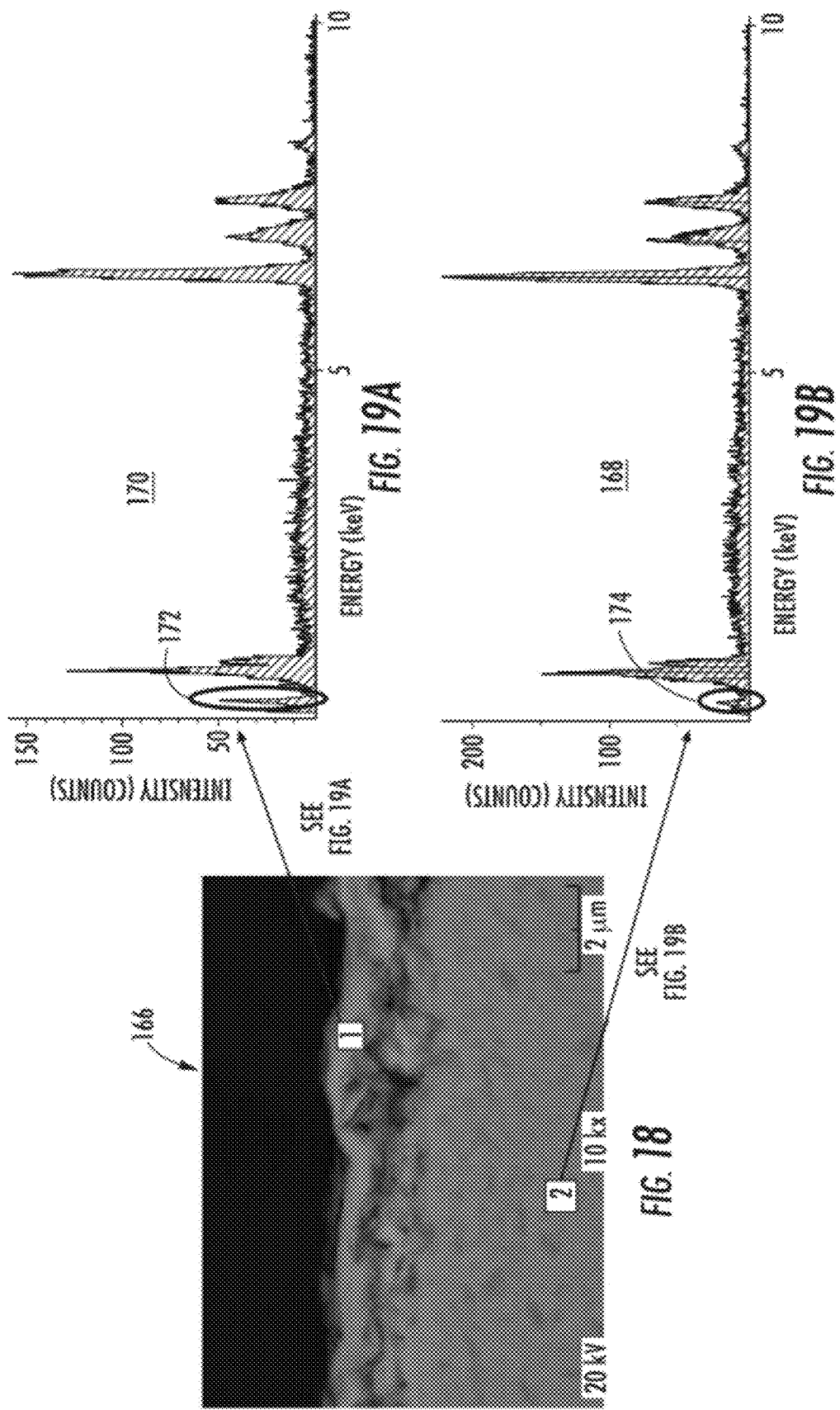

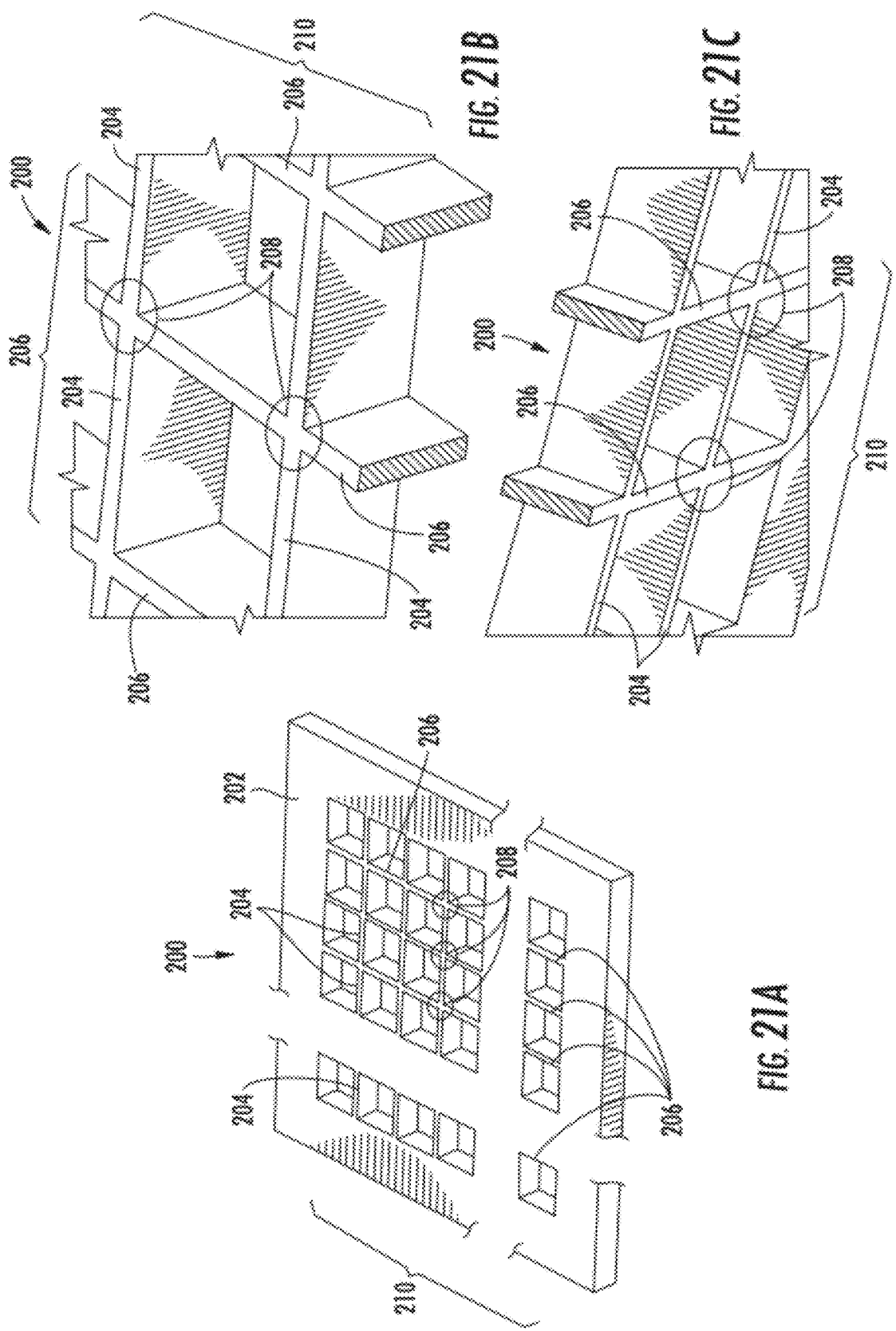

ELECTRODES, COMPONENTS, APPARATUSES, AND METHODS FOR BURR-FREE OR SUBSTANTIALLY BURR-FREE ELECTROCHEMICAL MACHINING

RELATED APPLICATIONS

This application claims the benefit of priority under 35 U.S.C. §119 of U.S. Provisional Application Ser. No. 61/447,549 filed on Feb. 28, 2011 the content of which is relied upon and incorporated herein by reference in its entirety.

BACKGROUND

Field of the Disclosure

The technology of the disclosure relates to machining of electrically-conductive workpieces. The machined electrically-conductive workpieces may be electrically-conductive shrouds or other electrically-conductive components used in various interconnect and electronics apparatuses, including printed circuit boards (PCBs).

Technical Background

Electrically-conductive workpieces are commonly used in manufactured products. A machining process can be performed to machine the electrically-conductive workpiece to the desired shape and size and having the desired geometric features. One method of machining electrically-conductive workpieces involves the use of conventional mechanical action machining techniques, such as grinding, turning, engraving, milling, and drilling. These conventional mechanical action machining techniques form the desired shape, sizes, and geometric features in the electrically-conductive workpieces by removing material using mechanical action.

An exemplary conventional machining process 10 employing mechanical action is illustrated in FIG. 1. As illustrated in FIG. 1, an electrically-conductive workpiece is machined to the desired size, shape, and/or geometric features (block 12). After machining, the workpiece may be cleaned to remove shavings and any other unwanted materials or debris from the machined workpiece (block 14). As a result of mechanical action machining, burrs may be formed in the workpiece. A burr is a raised edge or small piece of material attached to a workpiece after machining. Burrs are usually unwanted. Thus, after cleaning of the workpiece (block 14), the workpiece may be inspected for burrs (block 16). Inspection for burrs may be by means of human visual means or automated means, and may include the use of microscopes and other vision inspection machinery and apparatuses.

Burrs can cause numerous issues. For examples, burrs in drilled holes in machined workpieces can cause fastener and mechanical problems. Burrs can cause more stress to be concentrated at the edge of holes of machined workpieces, thereby decreasing resistance to fractures and shortening fatigue life. Burrs can also cause cracks by stress and strain on electrically-conductive workpieces that can result in material failure. Burrs may also trap cleaning and plating chemistry that increase the risk of mechanical and electrical failures. Burrs also increase the risk of corrosion, which may be due to variations in thickness of coatings placed on rougher surfaces to prevent corrosion. Further, sharp corners caused by burrs on electrically-conductive workpieces may concentrate electrical charge, thereby increasing static discharge and corrosion. If burrs are left to remain in moving parts, unwanted friction and heat can occur.

Because of the issues attributable to burrs, deburring is generally provided in a deburring process (block 18) to electrically-conductive workpieces after machining. Deburring involves the removal of burrs. Deburring can involve the application of mechanical, chemical, electrical, or any combination of these processes to workpieces. Deburring can also involve the application of abrasive cloths to workpieces, where the cloth is used to rub away burrs as well as polish the workpiece. In some cases, sanding of the workpiece may be necessary. Another common method of deburring is to physically pry or cut the burr from the surface using a sharpened instrument or tool. After deburring (block 18), the electrically-conductive workpiece can be cleaned (block 20) and a final inspection (block 22) performed to determine if burrs have been sufficiently removed from the machined workpiece. The final inspection (block 22) may involve the same inspection as block 16 in FIG. 1 or may involve a more rigorous inspection. If the machined workpiece does not pass final inspection (block 24), the deburring process can be repeated (blocks 16-20) with final re-inspection re-performed (block 22). Once the machined workpiece passes final inspection (block 24), the machining process 10 ends (block 26) with the resulting machined workpiece approved and ready for use in its intended application.

A deburring process, and particularly a hand deburring process, can add significant cost to an electrically-conductive workpiece. Deburring and inspection may take significant time and/or labor to perform. Further, some machined electrically-conductive workpieces may never pass final inspection and will have to be discarded. The hand deburring process may sufficiently remove burrs, but may cause the electrically-conductive workpiece to not be within other specifications, such as if material is worn away in certain locations more than other locations, or in a manner that causes tolerances of the electrically-conductive workpiece to not be within specifications.

SUMMARY OF THE DETAILED DESCRIPTION

Embodiments disclosed in the detailed description include electrodes, components, apparatuses, and methods for electrochemical machining (ECM). ECM may be employed to provide burr-free or substantially burr-free ECM of electrically-conductive workpieces. As one non-limiting example, the electrically-conductive workpiece may be a shroud that is used as an electrical component in electronics boards. While the ECM components, apparatuses, and methods disclosed herein significantly reduce and/or eliminate the formation of burrs, ECM can provide imprecise machining and cause stray erosions to occur in the machined electrically-conductive workpiece. In this regard, the electrodes, components, apparatuses, and methods for ECM disclosed herein provide features that allow for precise machining of the machined electrically-conductive workpiece and also allow avoidance of stray erosions in the machined electrically-conductive workpiece.

In one embodiment, an ECM apparatus for machining an electrically-conductive workpiece is provided. This ECM apparatus comprises an electrode. The ECM apparatus also comprises an electrode translation device configured to locate the electrode relative to an electrically-conductive workpiece to be machined. This ECM apparatus also comprises an electrode controller configured to control the electrode translation device to oscillate the electrode between a first distance from the electrically-conductive workpiece and a gap distance from the electrically-conductive workpiece and to maintain a gap between the electrode and the electrically-conductive workpiece when the electrode is located at the gap distance from the electrically-conductive workpiece. This ECM apparatus also comprises a circulator system configured to circulate an electrolyte into the gap between the electrode and the electrically-conductive workpiece. This ECM apparatus also includes a controllable power supply electrically connected to an electrically-conductive workpiece and the electrode, the controllable power supply configured to supply a power pulse to the electrically-conductive workpiece and the electrode when the electrode is disposed at the gap distance from the electrically-conductive workpiece. In this manner, the electrode is active to reduce material in the machined workpiece when the electrode is disposed at the gap distance to avoid uneven removal of material to provide straight or substantially straight machined surfaces and edges in the machined workpiece. In this ECM apparatus, the controllable power supply may also be configured to not supply a power pulse to the electrically-conductive workpiece and the electrode when the electrode is not disposed at the gap distance from the electrically-conductive workpiece.

In another embodiment, a method of ECM an electrically-conductive workpiece is provided. This method comprises securing an electrically-conductive workpiece to be machined on a platform disposed below an electrode attached to an electrode translation device configured to locate the electrode relative to the electrically-conductive workpiece. This method also comprises oscillating the electrode between a first distance from the electrically-conductive workpiece and a gap distance from the electrically-conductive workpiece to maintain a gap between the electrode and the electrically-conductive workpiece when the electrode is located at the gap distance from the electrically-conductive workpiece. This method also comprises circulating an electrolyte into the gap between the electrode and the electrically-conductive workpiece. This method also comprises supplying a power pulse to the electrically-conductive workpiece and the electrode only when the electrode is disposed at the gap distance from the electrically-conductive workpiece. This method may also comprise not supplying a power pulse to the electrically-conductive workpiece and the electrode when the electrode is not disposed at the gap distance from the electrically-conductive workpiece.

In another embodiment, an electrode for electrochemical cleaning of an electrically-conductive workpiece is provided. This electrode comprises an electrically-conductive body having a first end. This electrode also comprises at least one tapered electrically-conductive pin comprised of an electrically-conductive shaft comprised of a first end having a first width disposed on a first end of the electrically-conductive body and a second end having a second width comprised of an end face, the second width of the end face greater than the first width of the first end. In this manner, a clearance is provided in the at least one tapered electrically-conductive pin and an opening disposed in the electrically-conductive workpiece by the electrode via ECM.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 15 illustrates the shroud in FIGS. 14A-14C with a non-stained area and a stained area to analyze the shroud for corrosion susceptibility analysis;

FIGS. 16A and 16B illustrate scanning electron microscope examination results of the non-stained area and the stained area of the shroud in FIG. 15 to analyze the shroud for corrosion susceptibility analysis;

FIG. 18 illustrates a cross-sectional view of the shroud in FIG. 15 for corrosion susceptibility analysis;

FIGS. 19A and 19B illustrate energy dispersive x-ray spectroscopy (EDX/EDS) of a cross-sectioned stained area of the shroud in FIG. 18 for corrosion susceptibility analysis;

FIGS. 21A-21C are top perspective, close-up top perspective, and close-up bottom perspective views, respectively, of an exemplary electrode that may include any of the features described herein and that may be employed in an ECM apparatus to machine slots in a plurality of shrouds simultaneously.

DETAILED DESCRIPTION

Figure 1:
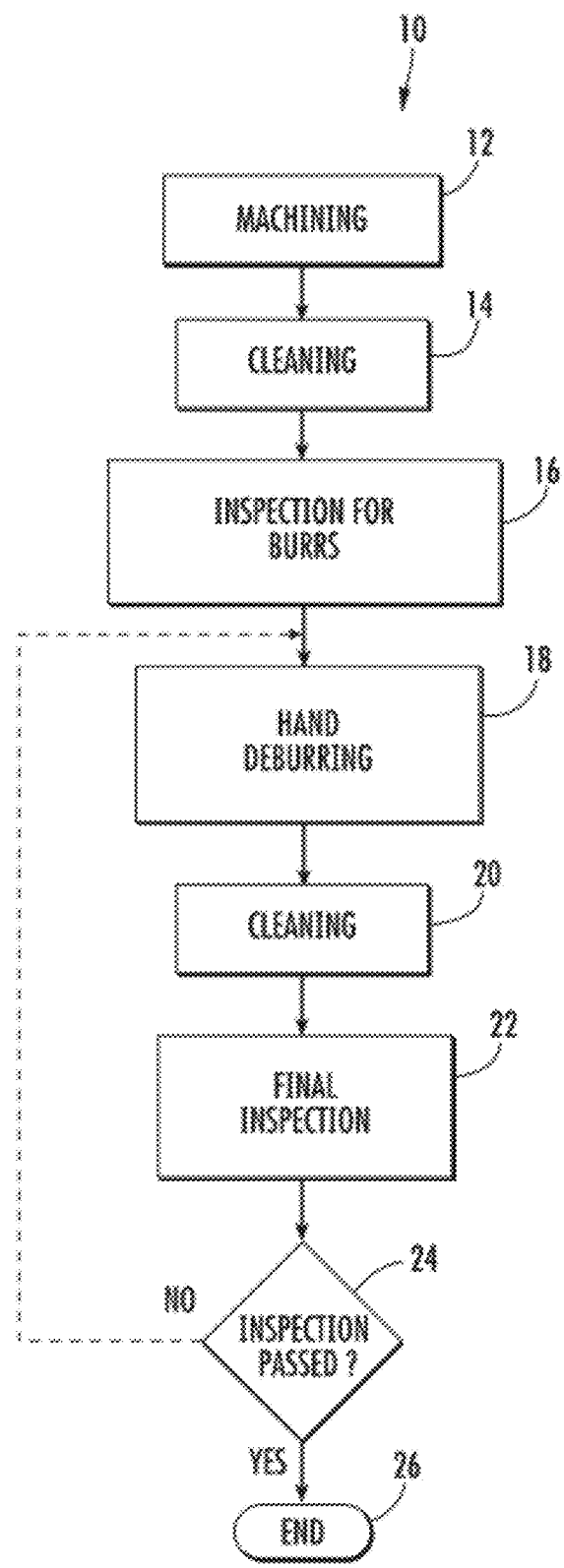
FIG. 1 illustrates an exemplary mechanical action machining process for an electrically-conductive workpiece that includes deburring and inspection.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include electrodes, components, apparatuses, and methods for electrochemical machining (ECM). ECM may be employed to provide burr-free or substantially burr-free ECM of electrically-conductive workpieces. As one non-limiting example, the electrically-conductive workpiece may be a shroud that is used as an electrical component in electronics boards. While the ECM components, apparatuses, and methods disclosed herein reduce and/or eliminate the formation of burrs, ECM can provide imprecise machining and cause stray erosions to occur in the machined electrically-conductive workpiece. In this regard, the electrodes, components, apparatuses, and methods for ECM disclosed herein provide features that allow for precise machining of the machined electrically-conductive workpiece and also allow avoidance of stray erosions in the machined electrically-conductive workpiece.

In one embodiment, an ECM apparatus for machining an electrically-conductive workpiece is provided. This ECM apparatus comprises an electrode. The ECM apparatus also comprises an electrode translation device configured to locate the electrode relative to an electrically-conductive workpiece to be machined. This ECM apparatus also comprises an electrode controller configured to control the electrode translation device to oscillate the electrode between a first distance from the electrically-conductive workpiece and a gap distance from the electrically-conductive workpiece and to maintain a gap between the electrode and the electrically-conductive workpiece when the electrode is located at the gap distance from the electrically-conductive workpiece.

This ECM apparatus also includes a controllable power supply electrically connected to an electrically-conductive workpiece and the electrode, the controllable power supply configured to supply a power pulse to the electrically-conductive workpiece and the electrode when the electrode is disposed at the gap distance from the electrically-conductive workpiece. In this manner, the electrode is active to reduce material in the machined workpiece when the electrode is disposed at the gap distance to avoid uneven removal of material to provide straight or substantially straight machined surfaces and edges in the machined workpiece. In this ECM apparatus, the controllable power supply may also be configured to not supply a power pulse to the electrically-conductive workpiece and the electrode when the electrode is not disposed at the gap distance from the electrically-conductive workpiece. Other features to improve ECM are also disclosed.

Figure 2A:
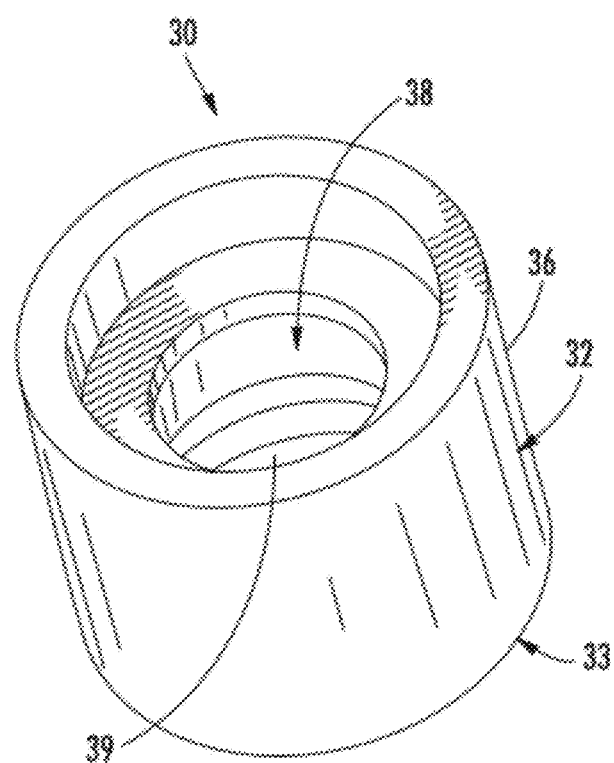
FIG. 2A is a perspective view of an exemplary electrically-conductive shroud workpiece that may be employed to provide a connector and/or to provide fastening or grounding to an electronics board.
Figure 2B:
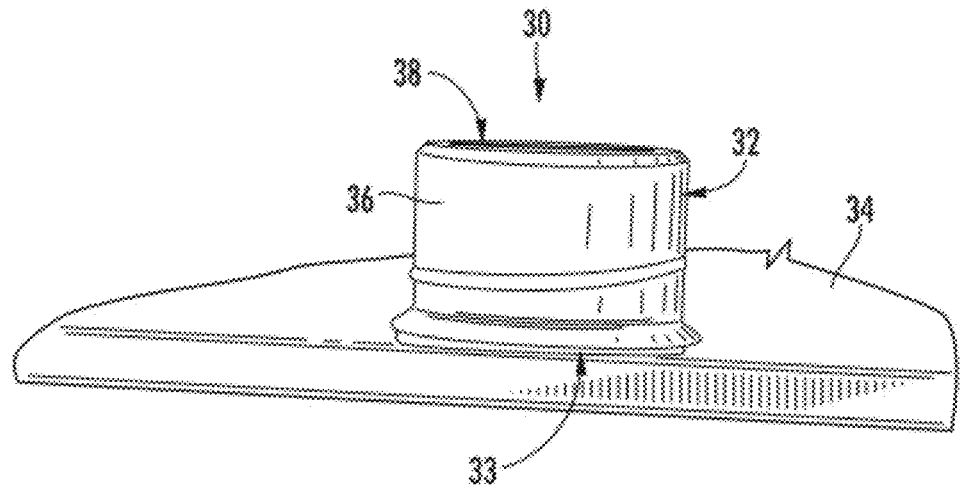
FIGS. 2B and 2C are side and top views, respectively, of the shroud in FIG. 2A attached to an electronics board.
Figure 2C:
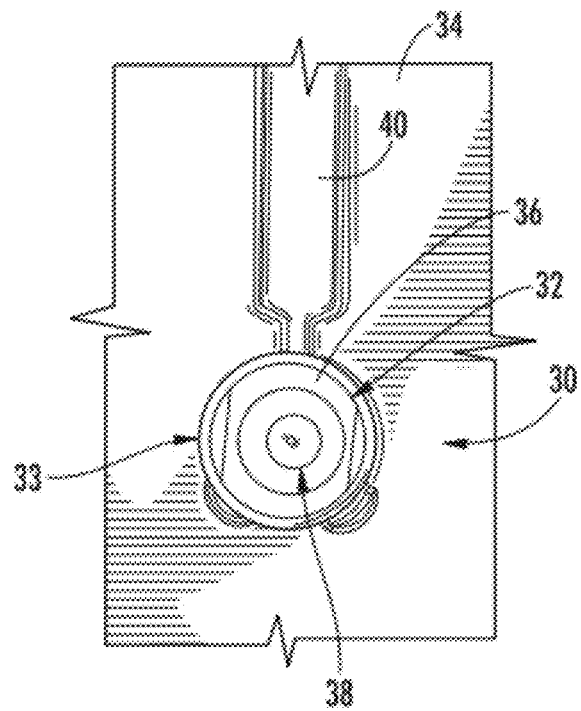

Prior to discussing the features and embodiments for improved ECM disclosed herein starting at FIG. 4, FIGS. 2A-2C and FIGS. 3A and 3B are first provided and described. FIGS. 2A-2C are perspective views of an exemplary electrically-conductive component 30 that can be machined burr-free or substantially burr-free according to embodiments disclosed herein. In this regard, FIG. 2A illustrates an exemplary electrically-conductive shroud workpiece (referred to as "shroud 32") that has not yet been machined according to the ECM embodiments disclosed herein. FIGS. 2B and 2C are side and top views, respectively, of a first end 33 of the shroud 32 in FIG. 2A brazed or soldered to an electronics board 34. The shroud 32 in this embodiment is comprised of a cylindrical body 36 of material that has been otherwise machined to dispose a counter bore 38 within the cylindrical body 36 to form an interior area 39 in this embodiment. The dimensions of the cylindrical body 36, the counter bore 38, and interior area 39 may be provided according to desired specifications depending on the application intended for the shroud 32.

The shroud 32 in FIGS. 2A-2C may be employed for various electronic applications as an example. For example, as illustrated in FIGS. 2B and 2C, the shroud 32 can be brazed or soldered to the electronics board 34 as part of a connector and/or to facilitate connection of another connector to the electronics board 34. The counter bore 38 can be provided to assist in aligning a connector connected to the electronics board 34. The counter bore 38 may also be grounded to a grounding node 40 in the electronics board 34, as illustrated in FIG. 2C, to provide grounding or additional grounding between the electronics board 34 and a received connector. Providing additional grounding may provide or enhance radio-frequency (RF) shielding between a received connector and any RF components on the electronics board 34, if any are provided therein.

With continuing reference to FIGS. 2A-2C, the shroud 32 may be machined from any material desired. For example, the material of the shroud may be Kovar® as one non-limiting example. Kovar® is a known iron-nickel-cobalt alloy with a coefficient of thermal expansion similar to that of hard glass. Thus, Kovar® finds wide usage in electronics for metal parts that are bonded to hard glass envelopes to avoid differences in expansion causing failures in joints. Kovar® may be particularly suited for uses that require a matched-expansion seal between metal and glass parts, such as between the shroud 32 and the electronics board 34 in FIGS. 2B and 2C, when the shroud 32 is brazed or soldered to the electronics board 34 and the assembly of glass or other material.

With continuing reference to FIGS. 2A and 2B, when the shroud 32 is brazed or soldered to the electronics board 34, solder or brazing flux may tend to remain in the interior area 39 of the shroud 32. Residual solder or brazing flux may short conductive components in an unintended manner. For example, a pin or other electrically-conductive component may be disposed from the electronics board 34 through the interior area 39 of the shroud 32 to provide for an electrical connection to the electronics board 34. Brazing or solder flux that remains may short the pin and the shroud 32 in an unintended and undesired manner. Thus, it may be desired to provide slots or other openings in the shroud 32 that facilitate residual brazing or solder flux egresses from the interior area 39. Slots may also allow the brazing or solder flux to be flushed out of the interior area 39 of the shroud 32 more easily when the shroud 32 is mounted to the electronics board 34.

Figure 3A:
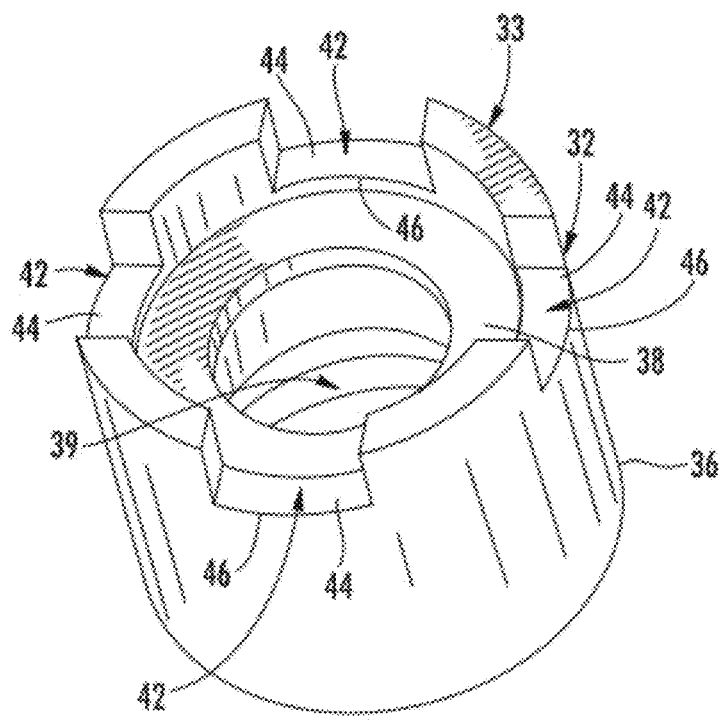
FIGS. 3A and 3B are perspective and side close-up views, respectively, of the shroud in FIG. 2A after being machined to add slots.
Figure 3B:
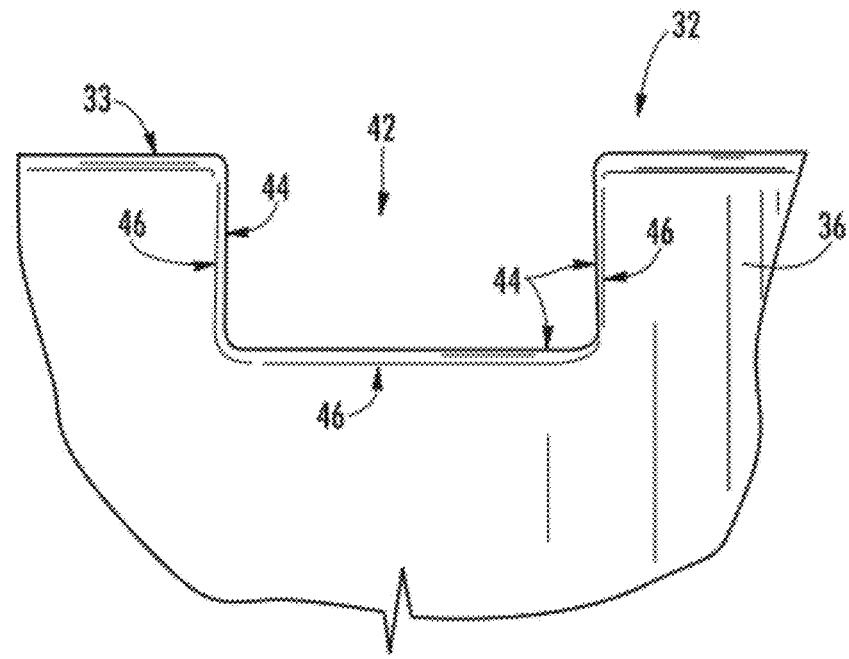

In this regard, FIGS. 3A and 3B are perspective and side close-up views, respectively, of the shroud 32 in FIGS. 2A-2C. However, the shroud 32 has been machined to add slots 42 to the first end 33 of the cylindrical body 36. The slots 42 are designed to allow brazing or solder flux, or any other flux, to egress through the slots 42 from the interior area 39 of the shroud 32 when the shroud 32 is mounted to an electronics board using a brazing or soldering operation, as an example. In this example, there are four (4) slots 42 disposed in the first end 33 of the cylindrical body 36 of the shroud 32. The slots 42 will be disposed adjacent to an electronics board when the shroud 32 is mounted thereto.

With continuing reference to FIGS. 3A and 3B, the slots 42 in the shroud 32 are machined into the shroud 32 using mechanical action process, such as by grinding, milling, sanding, turning, etc. As a result of mechanical action machining, burrs may be formed in shroud 32 along surface areas 44 and edges 46 of the slots 42. A burr is a raised edge or small piece of material attached to a workpiece after machining. Burrs are usually unwanted. Burrs can cause numerous issues. For examples, burrs can cause the shroud 32 to have mechanical problems. Burrs formed in the slots 42 as a result of their machining can limit or trap the egress or blazing or solder flux (i.e., a contaminate) from the interior area 39 of the shroud 32 during a brazing or soldering process to mount the shroud 32 to an electronics board. The trapped or residual brazing or solder flux may cause an undesirable conductive path to be set up and may provide for increased risk of corrosion in the shroud 32. Burrs can also cause more stress to be concentrated at the surface areas 44 and edges 46 of the slots 42 in the shroud 32, thereby decreasing resistance to fracture and shortening fatigue life. Burrs can also cause cracks by stress and strain that can result in material failure. Burrs also increase the risk of corrosion, which may be due to variations in thickness of coatings placed on surfaces of the shroud 32, including the surface areas 44 and edges 46 of the slots 42, to prevent corrosion. Further, sharp edges 46 caused by burrs on the shroud 32 may concentrate electrical charge, thereby increasing static discharge and risk of corrosion. If burrs are left to remain in moving parts, unwanted friction and heat can occur.

Thus, after cleaning of the machined shroud 32, the shroud 32 and slots 42 in particular may be inspected for burrs. Inspection for burrs may be by human visual means or automated means, and may include the use of microscopes and other vision inspection machinery and apparatuses. If burrs are presented in a sufficiently unwanted manner, the burrs can be removed from the shroud 32 using a deburring process. For example, hand deburring may be used. After deburring, the shroud 32 can be re-inspected and deburred again if sufficient burrs remain. Deburring is time consuming, costly, and the parts may be damaged during the deburring process. Thus, it is desired according to the embodiments herein to provide a machining process for disposing the slots 42 in the shroud 32 that are either burr-free or substantially burr-free and do not require a separate deburring process.

Figure 4:
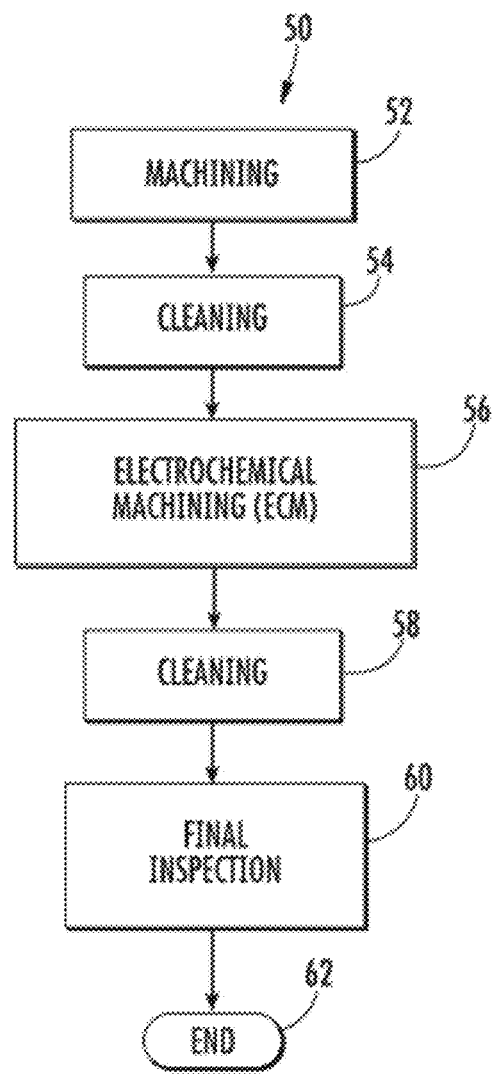
FIG. 4 illustrates an exemplary electrochemical machining (ECM) process to machine slots into the shroud in FIGS. 2A-2C to provide the machined slots in FIGS. 3A and 3B in a burr-free or substantially burr-free manner.

In this regard, FIG. 4 illustrates an exemplary electrochemical machining (ECM) process 50 to machine the slots 42 in the shroud 32 in FIGS. 3A and 3B in a burr-free or substantially burr-free manner. As one non-limiting example, burr-free or substantially burr-free can mean in one non-limiting embodiment that particles of materials removed from the shroud 32, and in particular material removed to form the slots 42, have lengths less than 0.0015 inch. As illustrated in FIG. 4, the shroud 32 would first be machined to the desired size, shape, and geometric features as illustrated in FIGS. 2A-2C (block 52). After machining, the shroud 32 may be cleaned to remove shavings and to otherwise remove any materials or other debris that are not part of the machined workpiece (block 54). As one example, cleaning may involve a soap and water mixture, ultrasonic cleaning, and alcohol dipping. For example, a mixture of Citranox and deionized water may be used as the cleaning solution. The shroud 32 is then further machined using ECM to dispose the slots 42 into the shroud 32, as illustrated FIGS. 3A-3B (block 56). As a result of the ECM the slots 42 into the shroud 32, the slots 42, including the surface areas 44 and edges 46 of the slots 42, are burr-free or substantially-burr free. Thus, a deburring process is not required as may be required after mechanical action machining. After ECM (block 56), the shroud 32 having the slots 42 machined therein can be cleaned (block 58) and a final inspection (block 60) performed before the process ends (block 62).

Figure 5A:
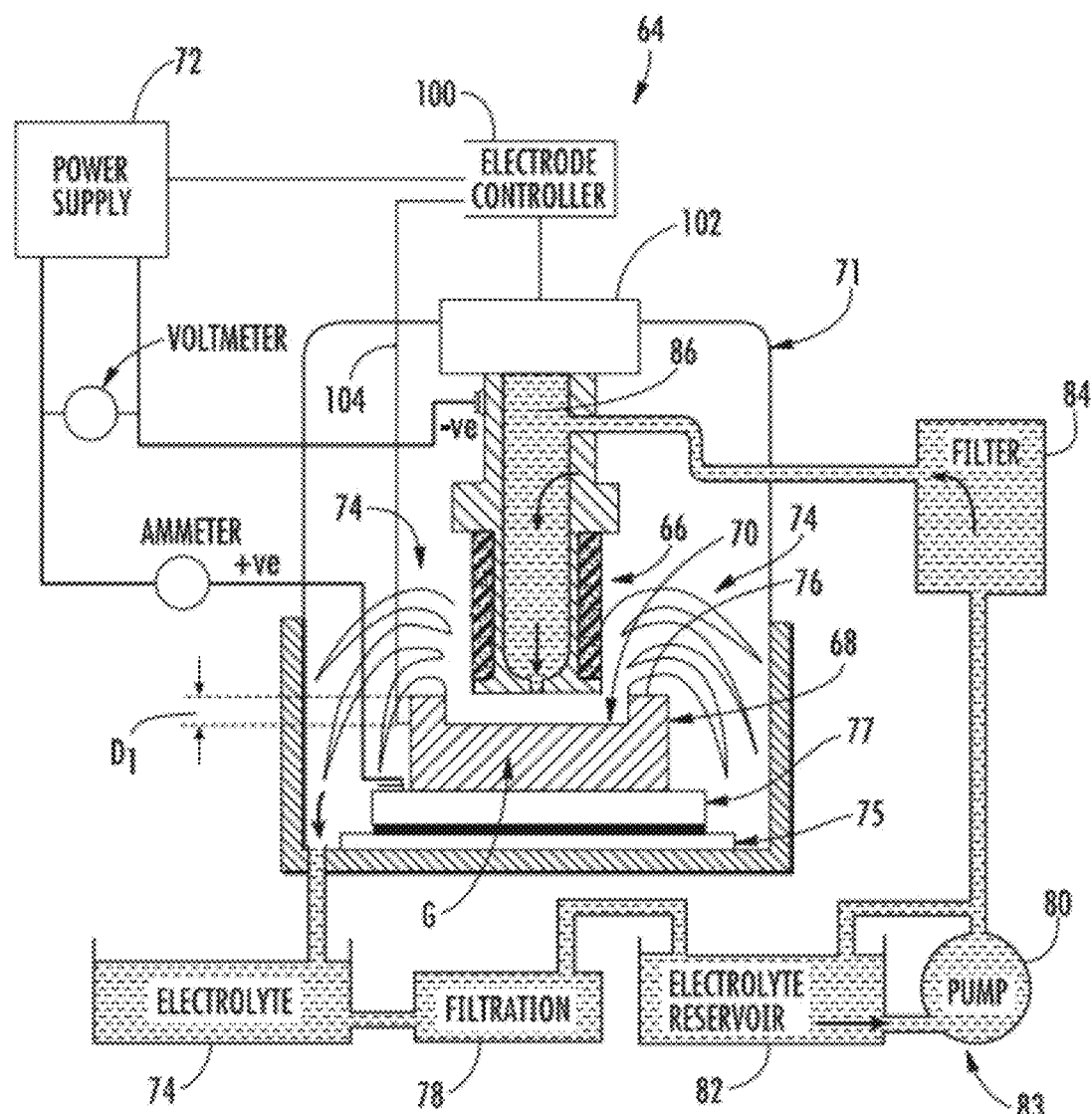
FIG. 5A is a schematic diagram of an exemplary ECM apparatus that is configured to perform the ECM process in FIG. 4, with an electrode disposed in a raised position.
Figure 5B:
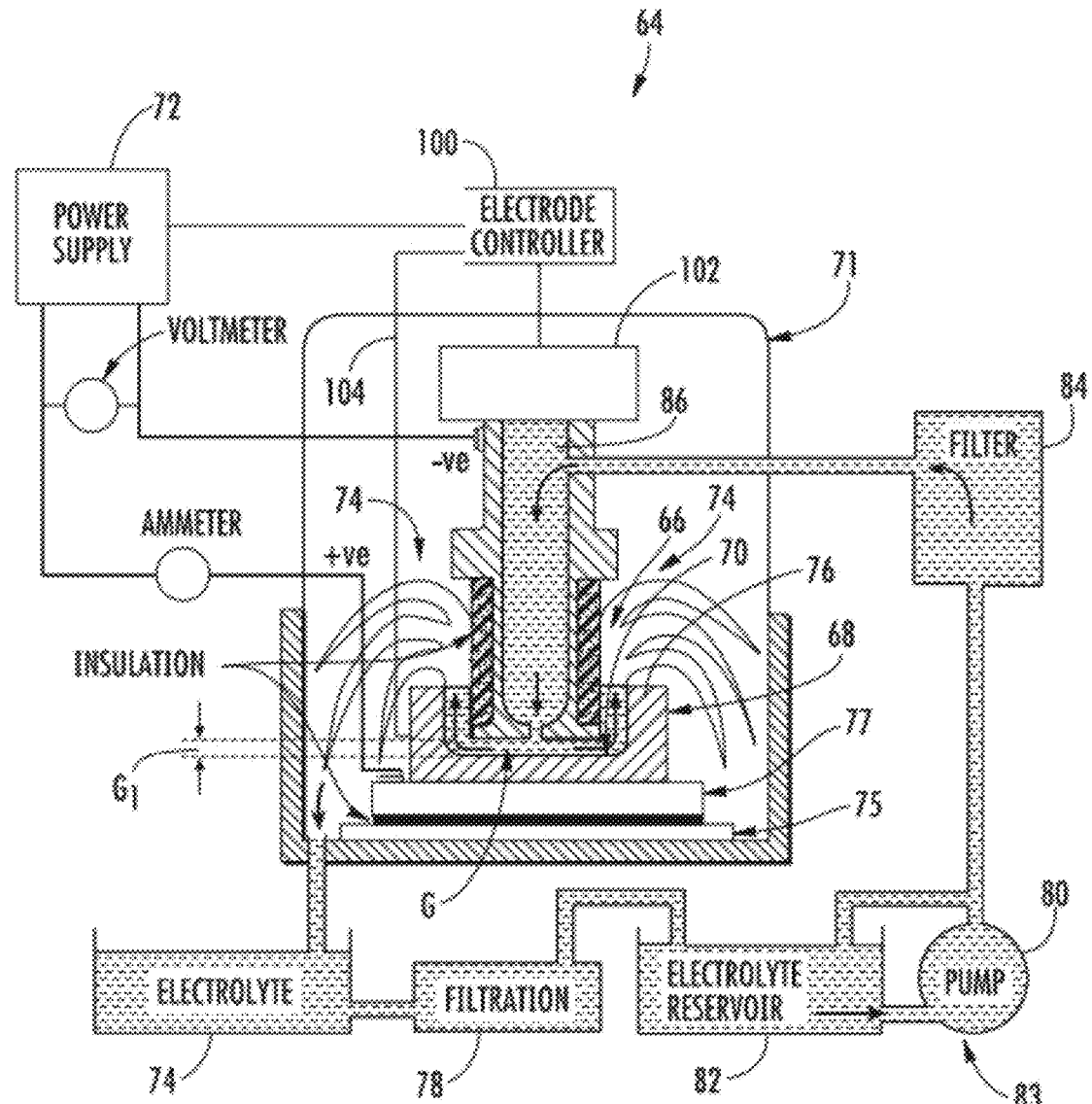
FIG. 5B is a schematic diagram of an exemplary ECM apparatus in FIGS. 5A and 5B, with the electrode disposed in a lowered position.
Figure 7A:
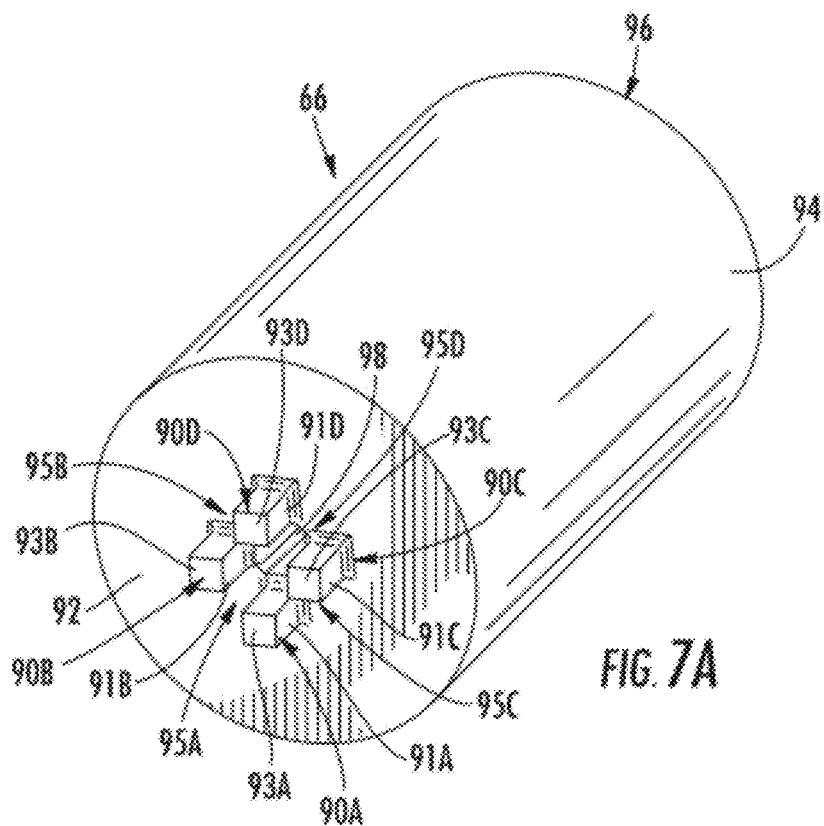
FIGS. 7A-7C are bottom perspective, top perspective, and side views, respectively, of an electrode that can be employed in the ECM process and apparatus in FIG. 4 and FIGS. 5A and 5B.
Figure 7B:
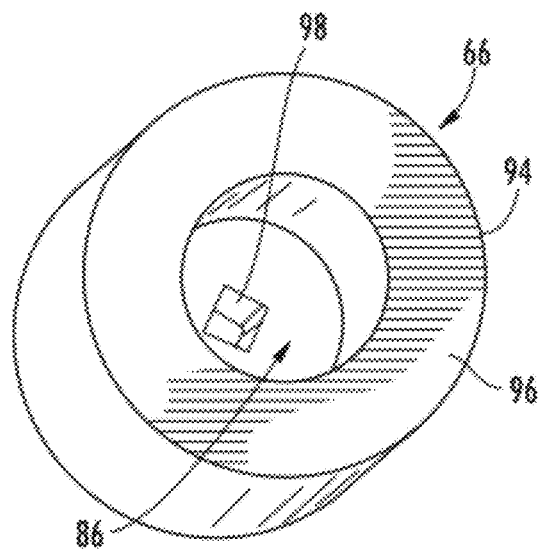
Figure 7C:
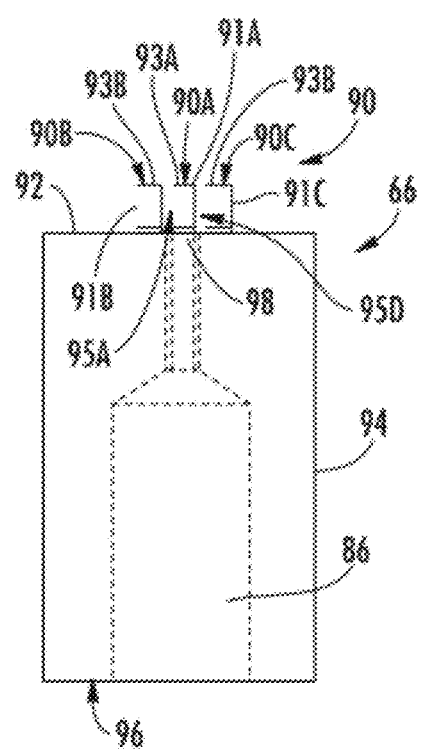

Specific features and techniques are provided in the ECM in block 56 of FIG. 4 in this disclosure to dispose slots, openings, or other features by material removal in an electrically-conductive workpiece. This material removal by ECM can include removing material to form the slots 42 in the shroud 32 in FIGS. 3A and 3B. In this regard, FIGS. 5A and 5B are schematic diagrams of an exemplary ECM apparatus 64 and process that is configured to perform the ECM process in block 58 of FIG. 4. FIG. 5A illustrates an electrode 66 in a raised position with respect to a shroud 68 to be machined. FIG. 5B illustrates the electrode 66 in a lowered position with respect to the shroud 68 to be machined. For example, the shroud 68 could be the shroud 32 in FIGS. 2A-2C. FIGS. 7A-7C illustrate bottom perspective, top perspective, and side views, respectively, of the electrode 66 in the ECM apparatus 64 in FIGS. 5A and 5B.

The ECM apparatus 64 and electrode 66 machines four (4) slots 70A-70D in the shroud 68, which may be like the slots 42 in FIGS. 3A and 3B. The size of the slots 70A-70D can be formed in the shroud 68 in any size that is effective for the desired application, such as allowing space for egress of brazing or solder flux as an example.

Figure 6:
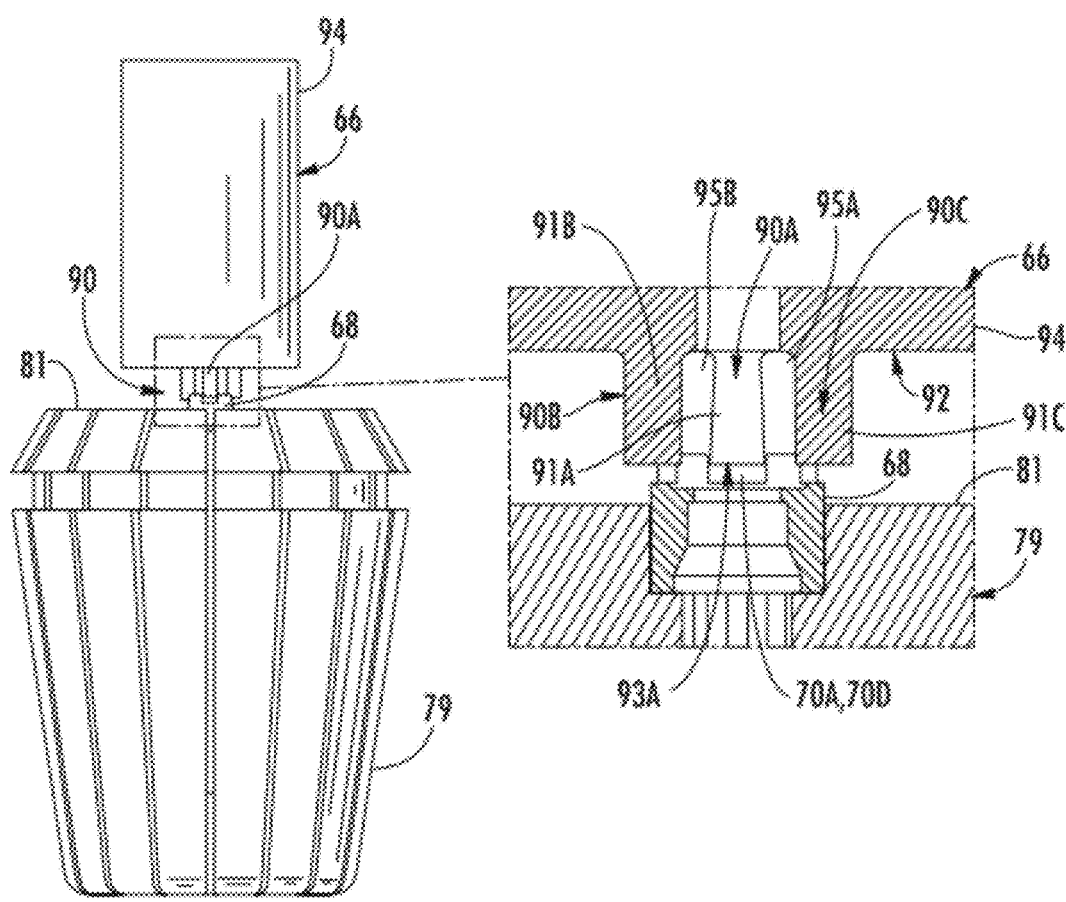
FIG. 6 is a schematic diagram of a collet holding an exemplary shroud with slots being machined therein by an exemplary electrode in the ECM process and apparatus of FIG. 4 and FIGS. 5A and 5B to ECM an electrically-conductive workpiece.

With continuing reference to FIGS. 5A and 5B, the ECM apparatus 64 in FIGS. 5A and 5B is configured to perform a process of removing metal material from the shroud 68 to machine the slots 70A-70D therein without the use of mechanical or thermal energy. The ECM apparatus 64 may be provided in an enclosure 71. Electrical energy from a power supply 72 is combined with a conductive electrolyte 74 to form an etching reaction to remove material from the shroud 68 to form the slots 70A-70D. The conductive electrolyte 74 should be selected to be compatible with electrical current provided by the power source 72. As one non-limiting, the conductive electrolyte 74 may be sodium nitrate. Any other conductive electrolyte 74 may be employed. The ECM apparatus 64 contains a base 75 and a fixture 77 mounted therein in this embodiment. The shroud 68 is disposed and held into place below the electrode 66. For example, the base 75 and fixture 77 may be provided as a collet 79, as illustrated in FIG. 6. As illustrated therein, the shroud 68 is held in place raised above a top surface 81 of the collet 79 below the electrode 66, wherein the electrode 66 can be brought into proximity to the shroud 68 to machine the slots 70A-70D in the shroud 68.

With reference to FIGS. 5A and 5B, the electrode 66 serves as the cathode, with the current being passed through the conductive electrolyte 74. The conductive electrolyte 74 is disposed between the electrode 66 and a first end 76 of the shroud 68. Current is supplied to the electrode 66 to supply electrode flux fields through the conductive electrolyte 74 to cause the electrode 66 to attract material from the shroud 68 for material removal machining. Specifically, at the first end 76 of the shroud 68, electrons from the first end 76 of the shroud 68 are removed by current flow, and the metallic bonds of the molecular structure at the surface of the first end 76. These removed atoms flow into the conductive electrolyte 74 as metal ions and form metallic hydroxides (MOH). These MOH molecules are then pumped away from the electrode 66 by a circulation system 83 that includes a pump 80. The MOH molecules are then filtered out in a filtration unit 78 into an electrolyte reservoir 82. After being filtered, the conductive electrolyte 74 in the electrolyte reservoir 82 is pumped through another filter 84 and through an interior chamber 86 of the electrode 66 to flow between the first end 76 of the shroud 68 and the electrode 66 for the process to repeat. For example, the interior chamber 86 is shown in more detail in FIGS. 7B and 7C, wherein the interior chamber 86 is disposed through an electrically-conductive body 94 on a second end 96 of the electrically-conductive body 94. The interior chamber 86 is fluidly coupled to an opening 98 on a first end 92 of the electrically-conductive body 94 to direct the conductive electrolyte 74 between the electrode 66 and the shroud 68.

To carry out this ECM method, direct current (DC) is passed between the shroud 68, which serves as an anode. The electrode 66 carries a complimentary pattern for the slots 70A-70D to be machined. For example, the complimentary pattern to the slots 70A-70D is provided by electrically-conductive pins 90 disposed in the electrode 66, as illustrated in FIG. 6 and FIGS. 7A and 7C. As illustrated in FIG. 6 and FIGS. 7A-7C, four (4) electrically-conductive pins 90A-90D comprised of four (4) electrically-conductive shafts 91A-91D are disposed in the first end 92 of the electrically-conductive body 94 of the electrode 66. Alternatively, the electrically-conductive pins 90A-90D could be wires instead of pins and provided in any diameter desired. The diameter or size of the pins or wires is configured based on the size of the opening or slot desired to be machined in an electrically-conductive workpiece.

With continuing reference to FIG. 6 and FIGS. 7A-7C, end faces 93A-93D disposed in the electrically-conductive pins 90A-90D are located on the opposite end of the electrically-conductive pins 90A-90D from the first end 92 of the electrically-conductive body 94 of the electrode 66. Voids 95A-95D are formed between the electrically-conductive pins 90A-90D to leave material in the shroud 68 where the voids 95A-95D are located. Thus, when the end faces 93A-93D of the electrically-conductive pins 90A-90D are disposed adjacent the shroud 68 in the ECM apparatus 64 as illustrated in FIGS. 5A and 5B, four (4) slots 70A-70D will be machined via ECM into the shroud 68 in the shape or general shape of the electrically-conductive pins 90A-90D.

The ECM apparatus 64 maintains a gap G between the electrode 66 and the shroud 68, as illustrated in FIGS. 5A and 5B. In this embodiment, the ECM apparatus 64 is configured to oscillate the electrode 66 between a first distance $D_1$ from the first end 76 of the shroud 68, as illustrated in FIG. 5A, and a gap distance $G_1$ from the first end 76 of the shroud 68, as illustrated in FIG. 5B. An electrode controller 100 is provided in the ECM apparatus 64 in FIGS. 5A and 5B. The electrode controller 100 is configured to control an electrode translation device 102 to oscillate the electrode 66 between the first distance $D_1$ and the gap distance $G_1$ from the shroud 68 and to maintain the gap G between the electrode 66 and the shroud 68. As one non-limiting example, the electrode controller 100 may be configured to control the electrode translation device 102 to oscillate the electrode 66 at an oscillation rate between 40 Hertz (Hz) and 60 Hz. For example, the oscillation rate may be 50 Hz as a non-limiting example.

As another non-limiting example, the electrode controller 100 may be configured to control the electrode translation device 102 to control a downward feed rate of the electrode 66 into the slots 70A-70D machined in the shroud 68 at a rate of 0.03 and 0.07 millimeters per minute (mm/min.). The electrode controller 100 may be configured to control the electrode translation device 102 to maintain the gap G between the electrode 66 and the shroud 68 when the electrode 66 is located at the gap distance $G_1$ by sensing the resistance of the shroud 68 using a resistive feedback loop 104.

Figure 8A:
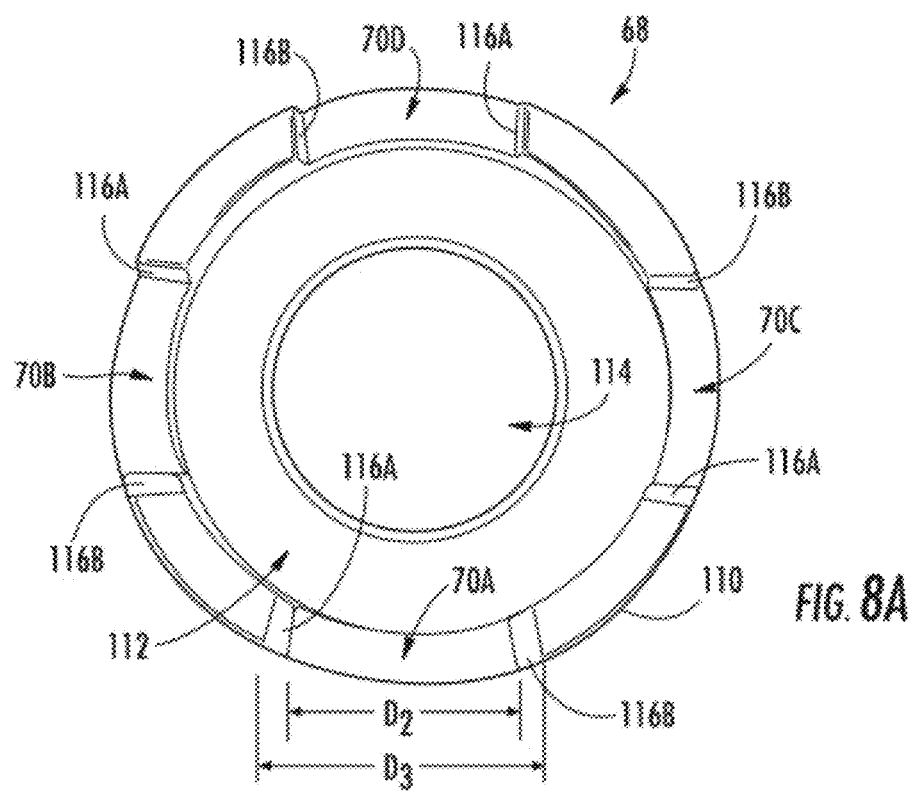
FIGS. 8A and 8B are top and close-up side views, respectively, of a shroud machined with slots using the ECM process and apparatus in FIG. 4 and FIGS. 5A and 5B.
Figure 8B:
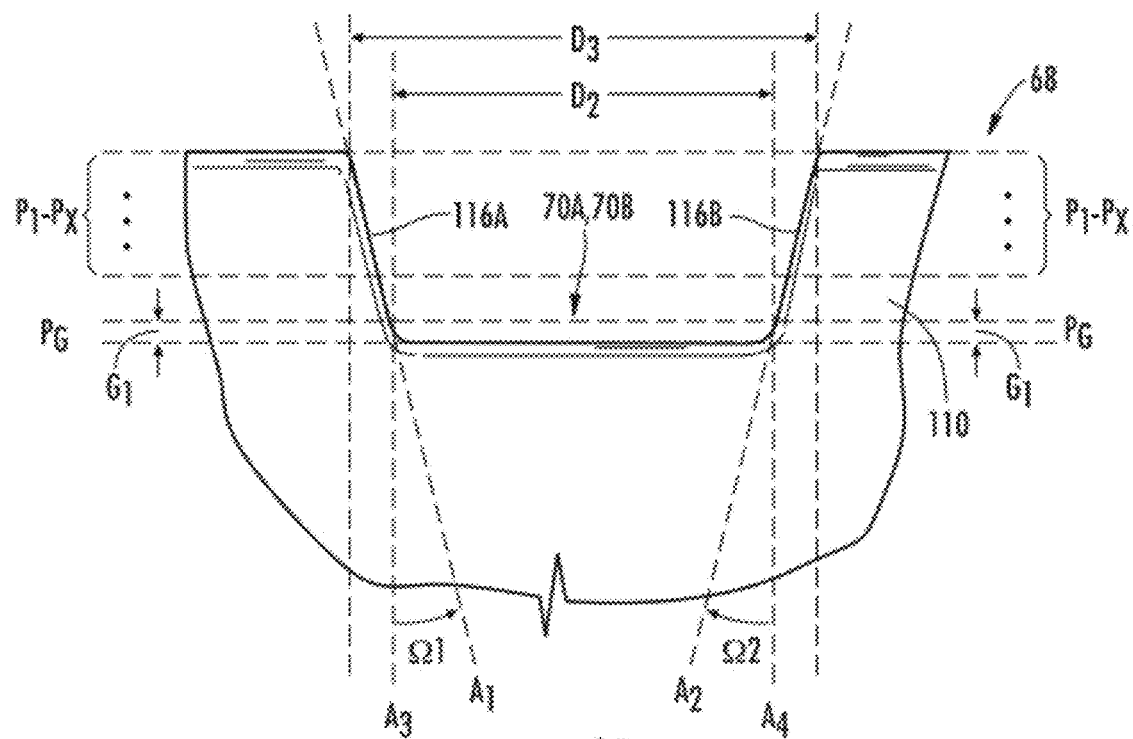

In the embodiment of the ECM apparatus 64 in FIGS. 5A and 5B, the power supply 72 is a controllable power supply. The power supply 72 is controlled by the electrode controller 100 to generate a power pulse to the shroud 68 and the electrode 66 when the electrode 66 is disposed at the gap distance $G_1$ from the shroud 68. The electrode controller 100 may also be configured to not supply a power pulse to the shroud 68 and the electrode 66 when the electrode 66 is not disposed at the gap distance $G_1$ from the shroud 68. Before describing power pulsing of the electrode 66 in the ECM apparatus 64 in FIGS. 5A and 5B to machine slots into a shroud, FIGS. 8A and 8B are first described. FIGS. 8A and 8B are top and side close-up views, respectively, of the shroud 68 machined with slots 70A-70D using the ECM apparatus 64 and process in FIG. 4 and FIGS. 5A and 5B without power pulsing.

With reference to FIGS. 8A and 8B, the shroud 68 is machined with the slots 70A-70D using the ECM apparatus 64 in FIGS. 5A and 5B in a burr-free or substantially burr-free manner. Like the mechanical action machined shroud 32 in FIGS. 2A-2C, the shroud in FIGS. 8A and 8B is comprised of a cylindrical body 110 of a material that has been otherwise machined to dispose a counter bore 112 within the cylindrical body 110 to form an interior area 114. The dimensions of the cylindrical body 110, the counter bore 112, and the interior area 114 may be provided according to desired specifications depending on the application intended for the shroud 68.

The shroud 68 in FIGS. 8A and 8B may be employed for various electronic applications, including, without limitation, for providing a connector mounted to an electronics board like illustrated in FIGS. 2B and 2C. The counter bore 112 can assist in aligning a connector. The counter bore 112 may also be grounded to a grounding node in an electronics board 34, similar to FIG. 2C, to provide grounding or additional grounding between an electronics board and a received connector. Providing additional grounding may provide or enhance radio-frequency (RF) shielding.

With continuing reference to FIGS. 8A and 8B, the shroud 68 may be provided from any material desired. For example, the material of the shroud 68 may be Kovar® as one non-limiting example. Kovar® is a known iron-nickel-cobalt alloy with a coefficient of thermal expansion similar to that of hard glass. Thus, Kovar® finds wide usage in electronics for metal parts that are bonded to hard glass envelopes to avoid differences in expansion causing failures in joints. Further, as previously described with regard to the machined shroud 32 in FIGS. 3A and 3B, it may be desired to provide the slots 70A-70D in the shroud 68 that facilitate allowing brazing or soldering flux to be flushed out of the interior area 114 of the shroud 68 when the shroud 68 is mounted to an electronics board 34.

With reference to FIG. 8B, note that side surfaces 116A, 116B of the slots 70A-70D machined in the cylindrical body 110 of the shroud 68 are not straight. In this regard, the side surfaces 116A, 116B machined in the shroud 68 in FIG. 8B are disposed along longitudinal axes $A_1$, $A_2$, respectively. Longitudinal axes $A_1$ and $A_2$ are disposed at angles $\Omega_1$ and $\Omega_2$, respectively, with regard to longitudinal axes $A_3$ and $A_4$, respectively. If the side surfaces 116A, 116B were straight, the side surfaces 116A, 116B would be aligned along the longitudinal axes $A_3$ and $A_4$ in FIG. 8B, and angles $\Omega_1$ and $\Omega_2$ would not exist or be zero degrees. Non-straight side surfaces 116A, 116B in the shroud 68 may cause the shroud 68 to not be within specifications. For example, if the shroud 68 was used to provide a connector assembly, the non-straight side surfaces 116A, 116B may cause alignment issues when the shroud 68 receives another connector.

The non-straight side surfaces 116A, 116B machined into the slots 70A-70D in FIGS. 8A and 8B may be formed in the shroud 68 if power is continuously supplied by the power supply 72 to the electrode 66 and the shroud 68 during oscillation of the electrode 66. This may cause the electrode 66 to cause material to be removed from the shroud 68 at horizontal planes $P_1$-$P_X$ in the slots 70A-70D unevenly and unevenly from a gap plane $P_G$, as illustrated in FIG. 8B. This is because the electrically-conductive pins 90A-90D of the electrode 66 will be energized with power at all times during oscillation of the electrode 66. Thus, the end faces 93A-93D of the electrically-conductive pins 90A-90D of the electrode 66 will be energized even when the end faces 93A-93D are not located at the gap distance $G_1$ to the shroud 68. This can cause material of the shroud 68 to be removed at planes $P_1$-$P_X$ when not similarly being removed at plane $P_G$ in the gap distance $G_1$, as illustrated in FIG. 8B.

To prevent the uneven removal of material in slots machined into a shroud during ECM that may create non-straight side surfaces, the electrode controller 100 in the ECM apparatus 64 of FIGS. 5A and 5B may control the power supply 72 to supply pulses of power to the electrode 66 instead of power being continuously supplied to the electrode 66. In this regard, the power supply 72 may be a controllable power supply. The electrode controller 100 may control the power supply 72 to provide power when the end faces 93A-93D of the electrically-conductive pins 90A-90D are located at the gap distance $G_1$ from a shroud. In this manner, the ECM apparatus 64 will not cause material to be removed from a shroud at locations that are not forming the bottom surface of the slot.

Figure 9:
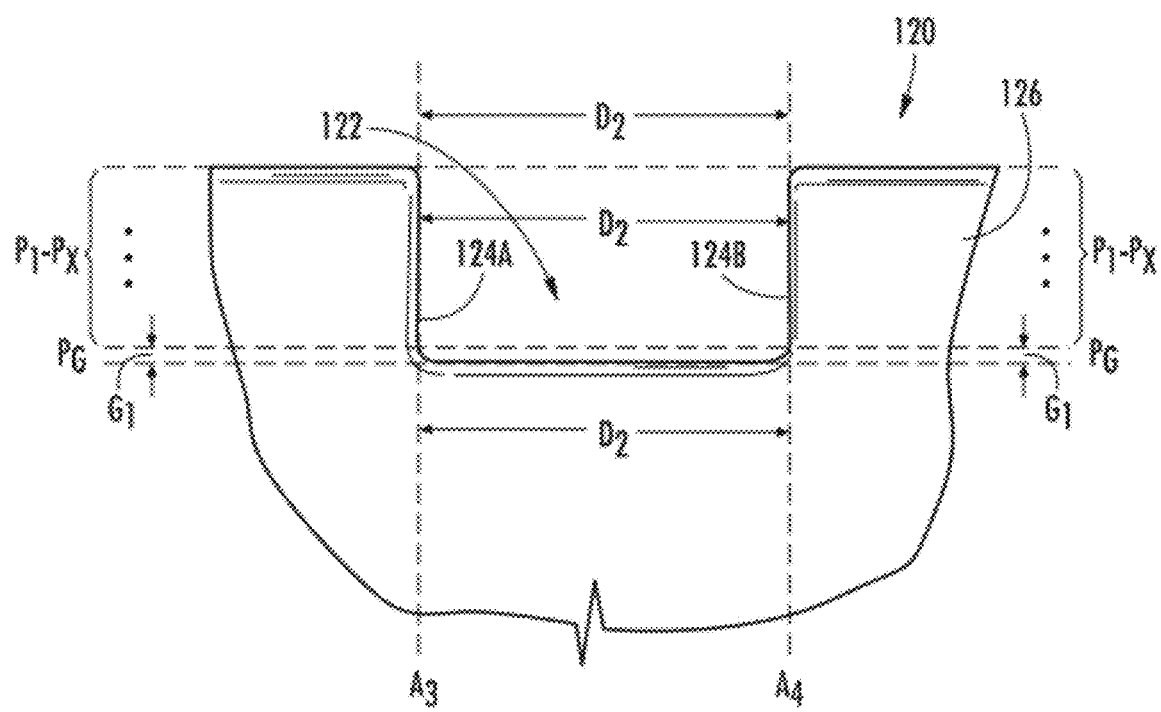
FIG. 9 is a close-up side view of a shroud machined with slots using the ECM process and apparatus in FIG. 4 and FIGS. 5A and 5B employing power pulsing.

In this regard, FIG. 9 is a close-up side view of a shroud 120. The shroud 120 looks similar to the shroud 68 in FIGS. 8A and 8B. However, the shroud 120 in FIG. 9 was machined with slots 122 using the ECM apparatus 64 and process in FIG. 4 and FIGS. 5A and 5B with power pulsing of the power supply 72. In one embodiment, the electrode controller 100 controls the power supply 72 to generate power when the end faces 93A-93D of the electrically-conductive pins 90A-90D are disposed at the gap distance $G_1$ to the shroud 120. As one non-limiting example, the electrode controller 100 may control the power supply 72 to provide power pulses for a duration of between 1.5 and 2.0 milliseconds (ms). The duration may be dependent on the oscillation rate of the electrode 66. In another embodiment, the electrode controller 100 further controls the power supply 72 to not generate power when the end faces 93A-93D of the electrically-conductive pins 90A-90D are not disposed at the gap distance $G_1$ to the shroud 120. Note that side surfaces 124A, 124B of the slot 122 machined in a cylindrical body 126 of the shroud 120 are straight or substantially straight. In this regard, the side surfaces 124A, 124B machined in the shroud 120 are disposed along longitudinal axes $A_3$, $A_4$, respectively, and a distance $D_2$ in the slot 122 is the same or substantially the same for all planes $P_1$-$P_X$ in the slot 122 and at the gap distance $G_1$ in plane $P_G$.

Additional techniques and features can be provided in the ECM apparatus 64 in FIGS. 5A and 5B to improve machining of slots in electrically-conductive workpieces, including the shrouds disclosed herein. For example, an insulating layer or dielectric layer can be disposed on the electrode to form a dielectric surface to prevent secondary discharge. Secondary discharge is discharge on the electrode other than the electrode surface directly above the surface of an electrically-conductive workpiece to be removed, which is primary discharge. Secondary discharge may cause material of an electrically-conductive workpiece to be removed from the side surfaces of the slot machined therein unwantededly.

Figure 10A:
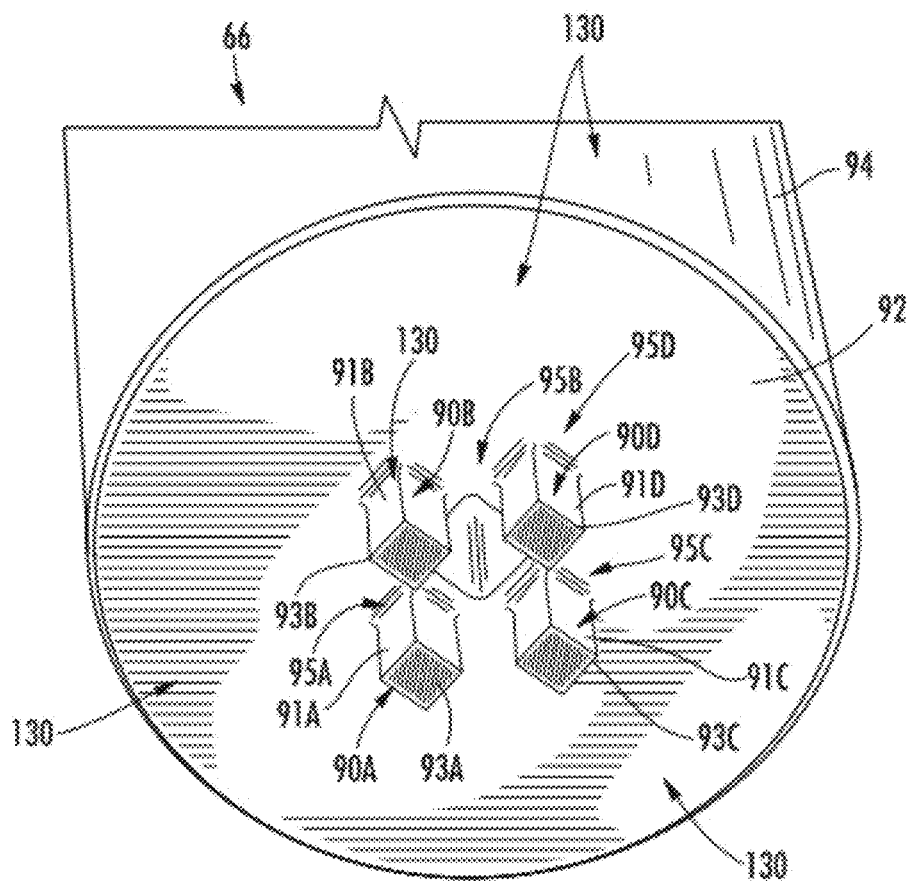
FIG. 10A is a bottom perspective view of electrically-conductive pins disposed in an end of the electrode in FIGS. 7A-7C having a dielectric layer(s) disposed on side walls of the electrically-conductive pins with end faces of the electrically-conductive pins exposed from the dielectric layer(s)
Figure 10B:
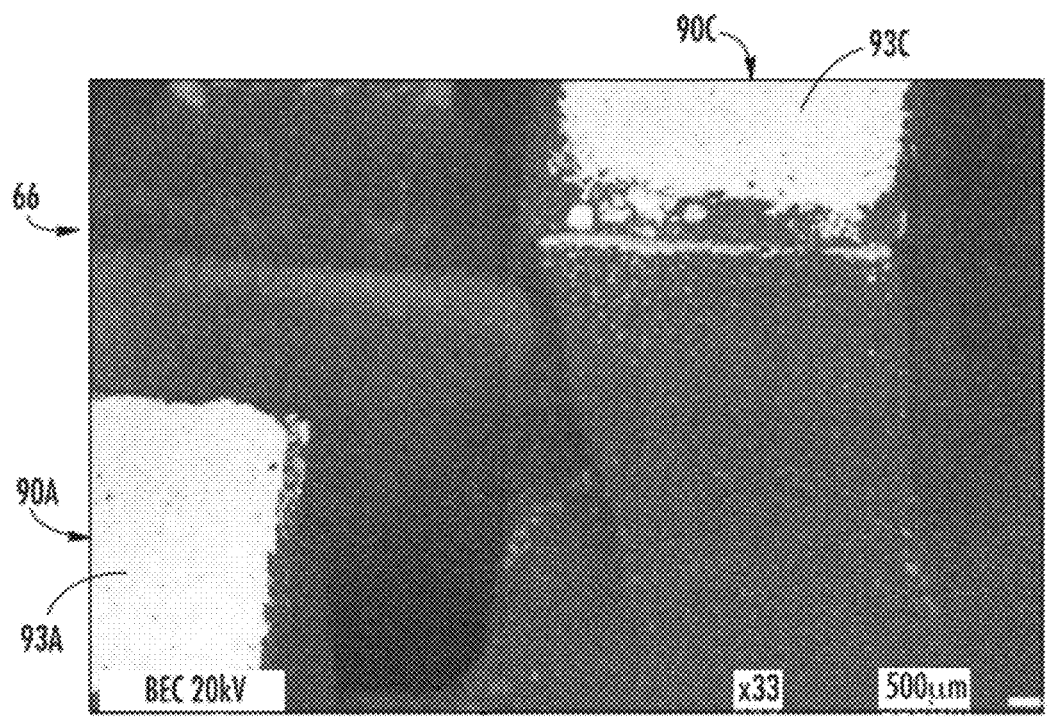
FIGS. 10B and 10C are close-up bottom views of the electrically-conductive pins disposed in the bottom of the electrode in FIGS. 7A-7C with the end faces of the electrically-conductive pins exposed from the dielectric layer(s)
Figure 10C:
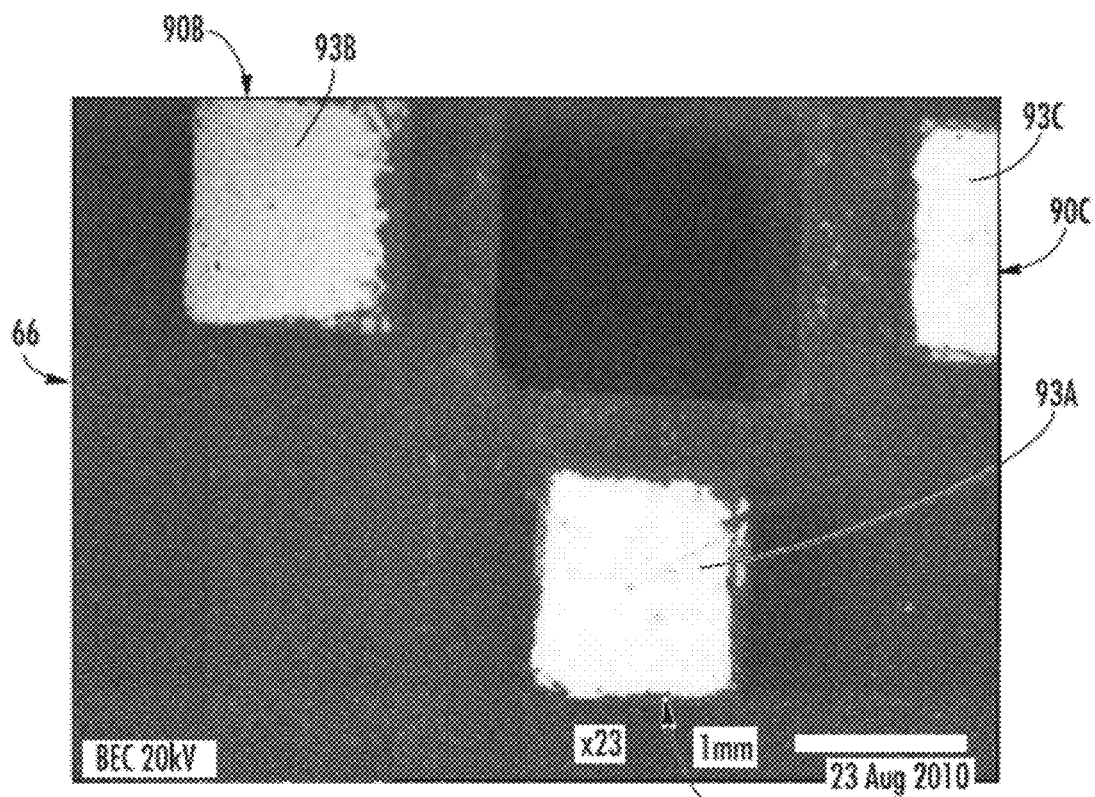

In this regard, FIG. 10A is a bottom perspective view of the electrode 66 in FIGS. 7A-7C. A dielectric layer(s) 130 is disposed on the electrically-conductive body 94 of the electrode 66 as well as the electrically-conductive pins 90A-90D. For example, the electrode 66 may be dipped in an insulating material or coating to create the one or more dielectric layer(s) 130. Providing the dielectric layer(s) 130 can prevent or reduce secondary discharge. For example, the dielectric layer(s) 130 may be comprised from one or more of the following materials: Parylene, amorphous carbon, growth of non conductive oxides through anodizing, heat treatments, etc., as non-limiting examples. However, so as to not affect primary discharge, the dielectric layer(s) 130 is removed from the end faces 93A-93D of the electrically-conductive pins 90A-90D in the embodiment of the electrode 66 in FIG. 10A. FIGS. 10B and 10C are close-up bottom views of the electrically-conductive pins 90A-90D disposed in the first end 92 of the electrically-conductive body 94 of the electrode 66 with the end faces 93A-93D of the electrically-conductive pins 90A-90D exposed from the dielectric layer(s) 130. The dielectric layer(s) 130 may be disposed on the electrode 66 at any thickness desired. A small, non-porous and continuous thickness may be desired to prevent physical contact and current leakage, between sides of electrode and workpiece. As one non-limiting example, the dielectric layer(s) 130 may be disposed on the electrode 66 at a thickness less than eleven (11) micrometers (μm).

Figure 11A:
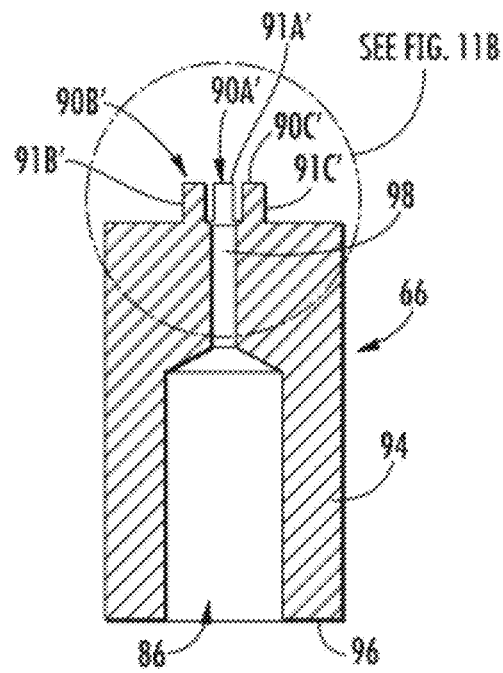
FIGS. 11A and 11B are side cross-sectional and close-up side cross-sectional views, respectively, of an electrode that includes tapered electrically-conductive pins.
Figure 11B:
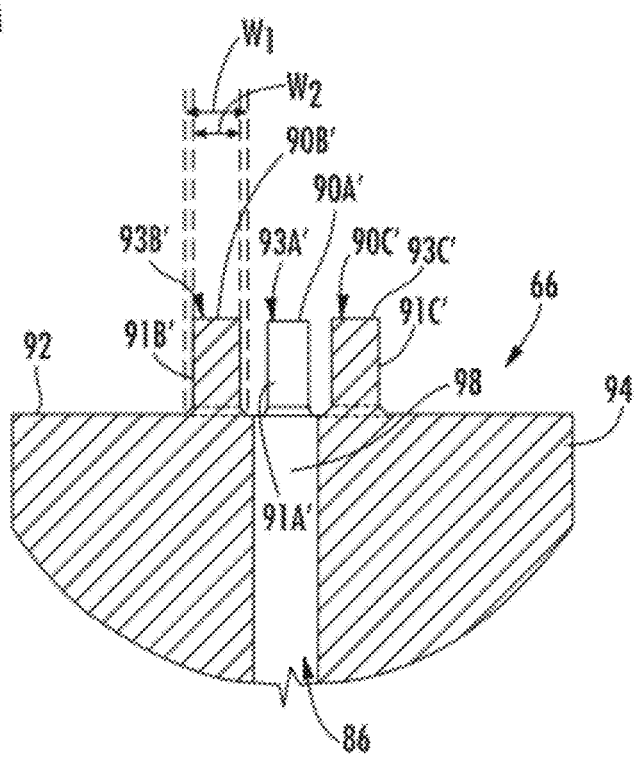

Another technique and feature can be provided in the ECM apparatus 64 in FIGS. 5A and 5B to improve machining of slots in electrically-conductive workpieces to provide tapering in the electrically-conductive pins 90A-90D of the electrode 66. In this regard, FIGS. 11A and 11B are side cross-sectional and close-up side cross-sectional views, respectively, of the electrode 66 in FIGS. 7A-7C and illustrating optional tapered electrically-conductive pins 90A'-90D'. End faces 93A'-93D' of the electrically-conductive pins 90A'-90D' have widths $W_1$, which are greater than widths $W_2$ of the electrically-conductive pins 90A'-90D' at the first end 92 of the electrode 66. For example, $W_2$ may be fifty percent (50%) or less of width $W_1$ as one non-limiting example. As another non-limiting example, the first width $W_1$ may be 1.1 to 2 times greater than the second width $W_2$. Providing tapered electrically-conductive pins 90A'-90D' assists in machining straight edge surfaces in an electrically-conductive workpiece, such as the slots in the shrouds described above. Because the width $W_2$ of the electrically-conductive pins 90A'-90D' at the first end 92 is less than the width $W_1$ and greater at the end faces 93A'-93D', the shafts 91A'-91D' of the electrically-conductive pins 90A'-90D' are located at a farther distance away from the side surfaces formed by the end faces 93A'-93D'. Thus, unwanted material removal from side surfaces of a machined electrically-conductive workpiece is avoided or reduced.

Figure 12A:
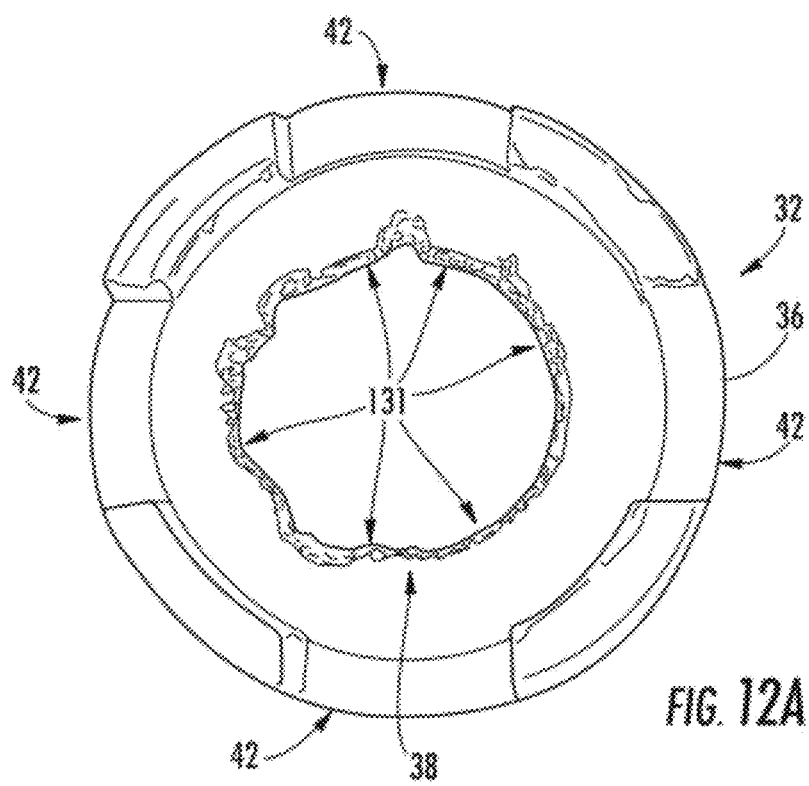
FIGS. 12A and 12B are top and side views, respectively, of a shroud after being machined with slots using the ECM process and apparatus in FIG. 4 and FIGS. 5A and 5B according to one embodiment.
Figure 12B:
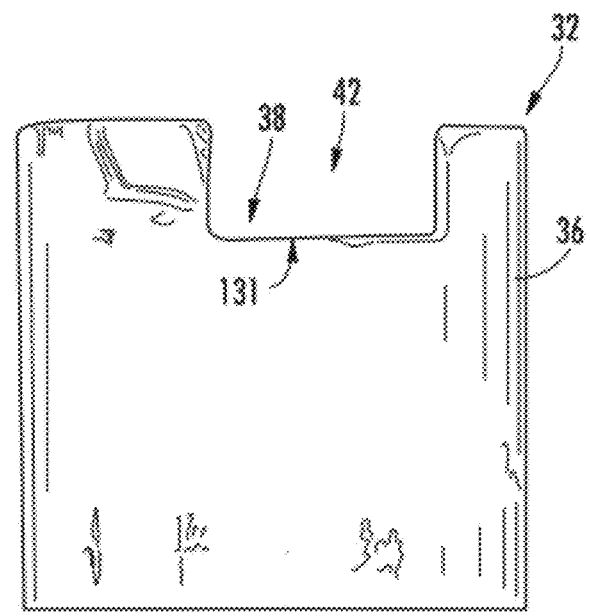

If sharp edges are machined in an electrically-conductive workpiece using the ECM apparatus 64 in FIGS. 5A and 5B, current from the power source 72 may be preferentially drawn to the sharp edges. This preferential current draw may cause excess removal of material (i.e., erosion) from areas in the electrically-conductive workpiece where current is preferentially drawn. In this regard, FIGS. 12A and 12B illustrate top and side views, respectively, of the shroud 32 in FIG. 2A after being machined with slots 42 using the ECM apparatus 64 and process in FIG. 4 and FIGS. 5A and 5B according to one embodiment. As illustrated therein, excess material was removed from an edge 131 of the counter bore 38. Further, the material removal from the shroud 32 is not uniform as illustrated in FIG. 12B.

Figure 13A:
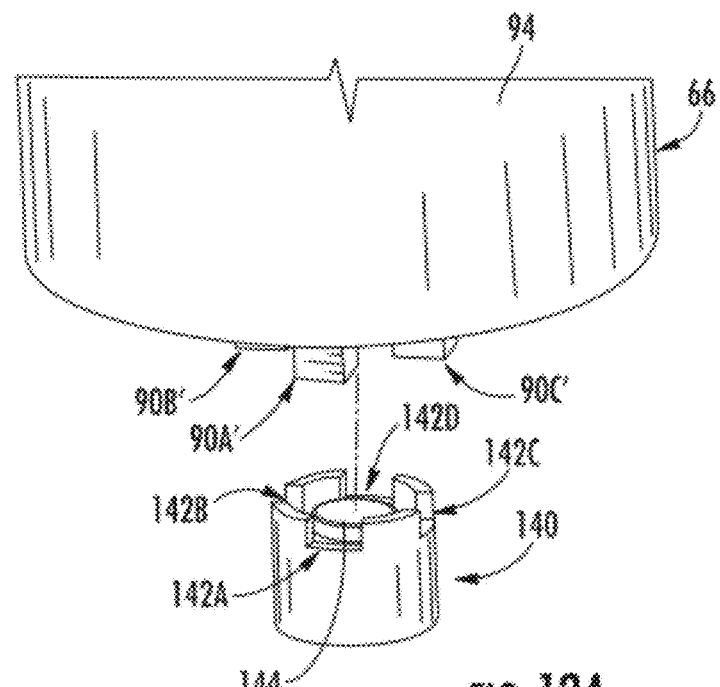
FIG. 13A is perspective side view of the electrode in FIGS. 11A and 11B disposed above a shroud to prepare to machine slots in the shroud, wherein a sacrificial anode is disposed in an internal chamber of the shroud.
Figure 13B:
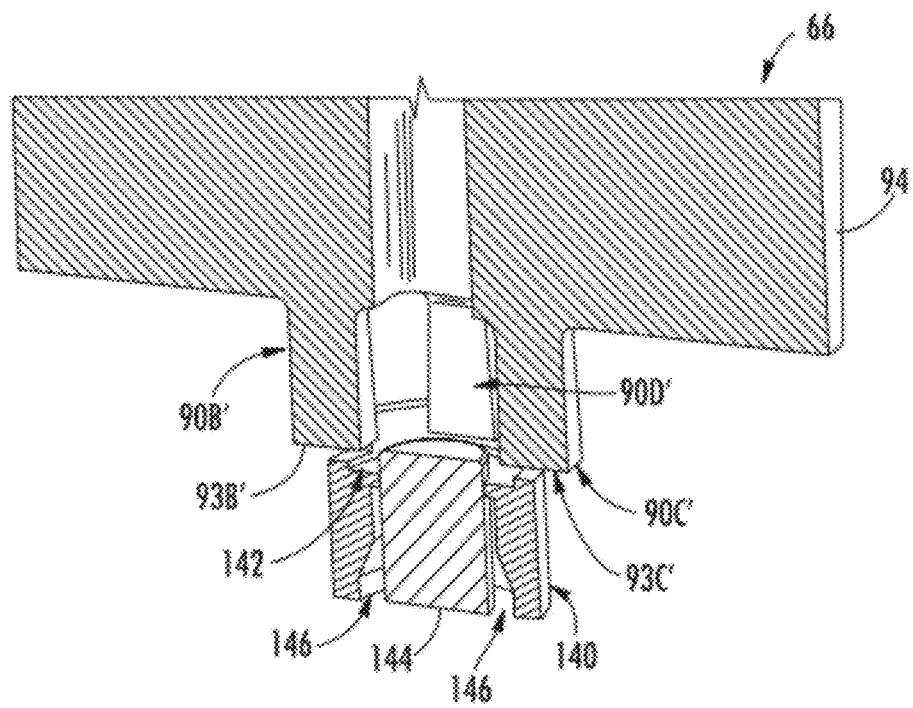
FIG. 13B is perspective side, cross-sectional view of the electrode in FIGS. 11A and 11B disposed on a shroud to machine slots in the shroud with a sacrificial anode disposed in the internal chamber of the shroud.

To assist in preventing excess, unwanted material removal from an electrically-conductive workpiece, including a shroud as an example, a sacrificial post can be employed during ECM by the ECM apparatus 64 in FIGS. 5A and 5B. In this regard, FIG. 13A is a perspective side view of the electrode 66 in FIGS. 11A and 11B having tapered electrically-conductive pins 90A'-90D' disposed above a shroud 140. The shroud 140 may be the shroud 32 in FIG. 2A in one embodiment. FIG. 13B is perspective side cross-sectional view of the electrode 66 in FIGS. 11A and 11B disposed in a gap distance to the shroud 140 to machine slots 142A-142D in the shroud 140. A sacrificial post 144, which is a sacrificial anode in this embodiment, is disposed in an internal chamber 146 of the shroud 140 to prevent current from the power supply 72 in FIGS. 5A and 5B from preferentially being drawn to the edges of the slots 142A-142D machined in the shroud 140. The current is drawn to the sacrificial post 144. The sacrificial post 144 is made from a material that erodes easier than the material of the shroud 140. As a non-limiting example, the sacrificial post 144 may be made from tungsten carbide. Thus, current drawn to the sacrificial post 144 will erode the sacrificial post 144 instead of the edges of the slots 142A-142D. The sacrificial post 144 can be removed after the shroud 140 is machined and reused for machining additional shrouds until sufficiently eroded to no longer be sufficient to draw current away from the edges of the slots 142A-142D. The sacrificial post 144 can then be discarded.

Figure 14A:
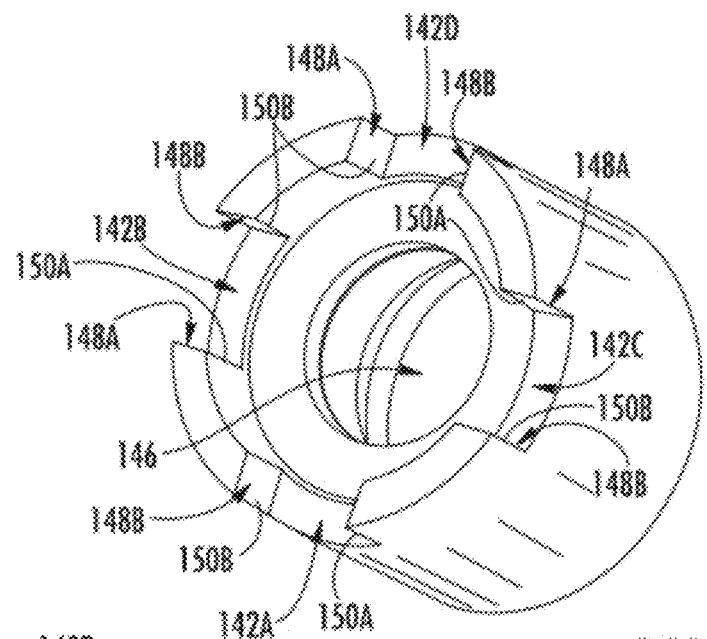
FIGS. 14A-14C are perspective, top, and side cross-sectional views, respectively, of the machined shroud in FIGS. 13A and 13B according to the ECM process and apparatus in FIG. 4 and FIGS. 5A and 5B with power pulsing, and/or the electrode features in FIGS. 10A-11B, and/or with the sacrificial anode disposed in the shroud in FIGS. 13A and 13B.
Figure 14B:
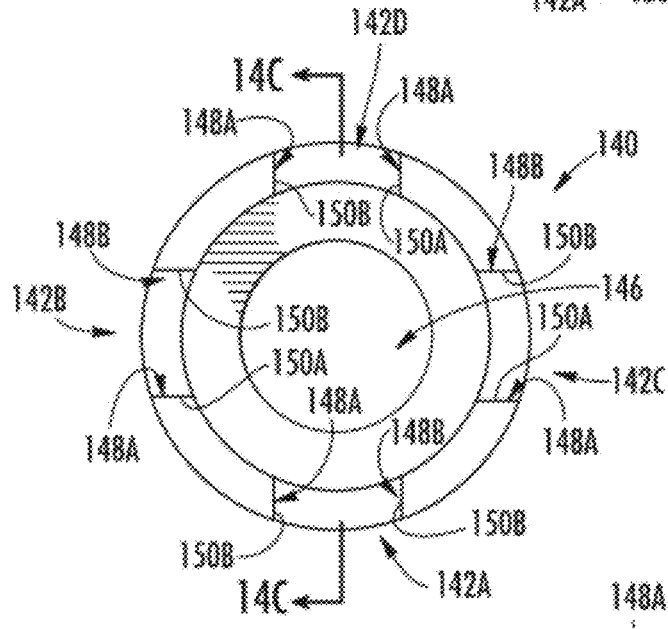
Figure 14C:
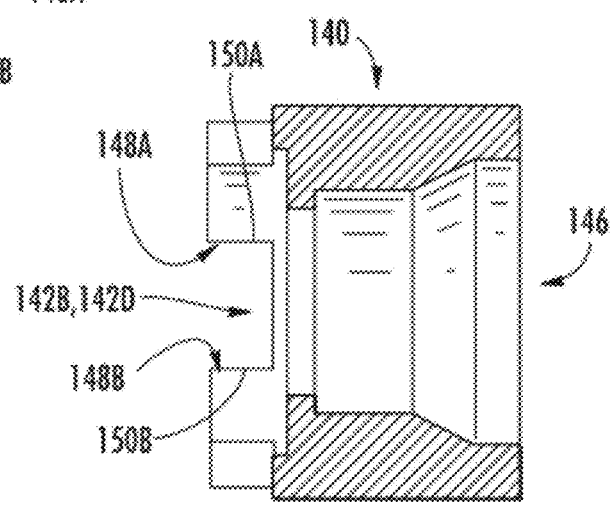

To further illustrate the effectiveness of one or more of the various features disclosed herein for improved ECM, FIGS. 14A-14C are provided. FIGS. 14A-14C are perspective, top, and side cross-sectional views, respectively, of the machined shroud 140 in FIGS. 13A and 13B according to the ECM apparatus 64 and process in FIG. 4 and FIGS. 5A and 5B with power pulsing, and/or the electrode features in FIGS. 10A-11B, and/or with the sacrificial anode 144 disposed in the shroud 140 in FIGS. 13A and 13B. Sides surfaces 148A, 148B machined into the shroud 140 as a result of machining the slots 142A-142D are straight. The edges 150A, 150B formed in the slots 142A-142D do not exhibit erosion or significant erosion due to the presence of the sacrificial post 144 (FIGS. 13A and 13B) during ECM.

Figure 17A:
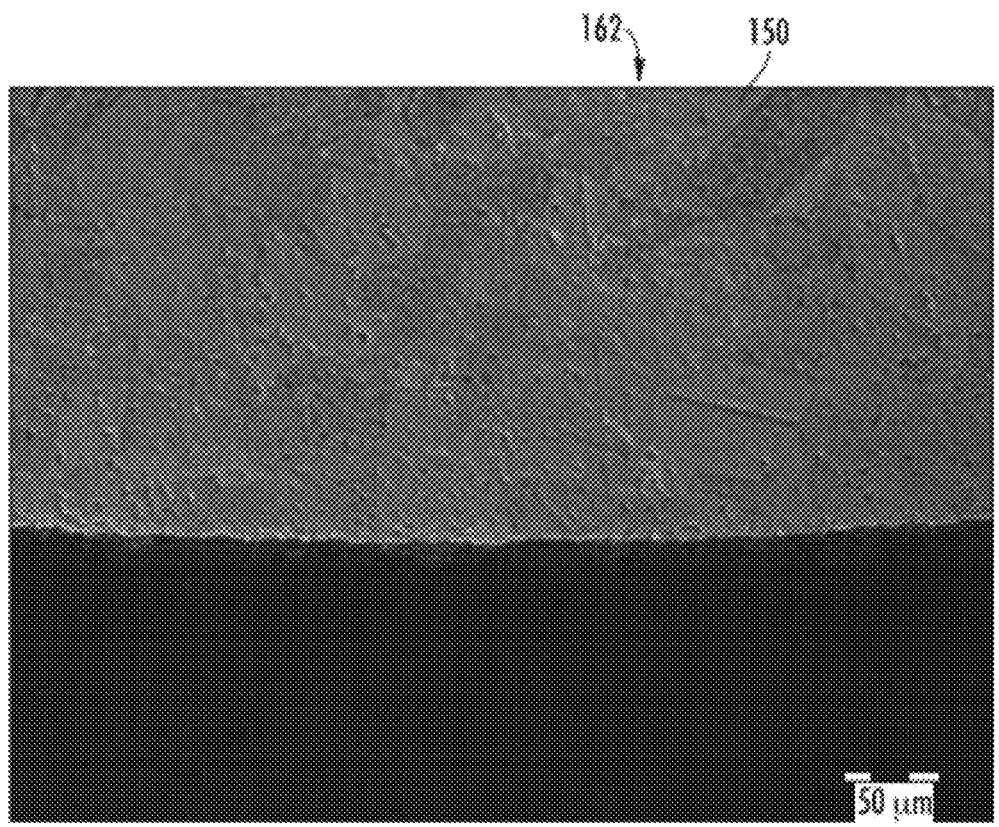
FIGS. 17A and 17B illustrate photomicrographs showing the microstructure of the stained and non-stained areas of the shroud in FIG. 15.
Figure 17B:
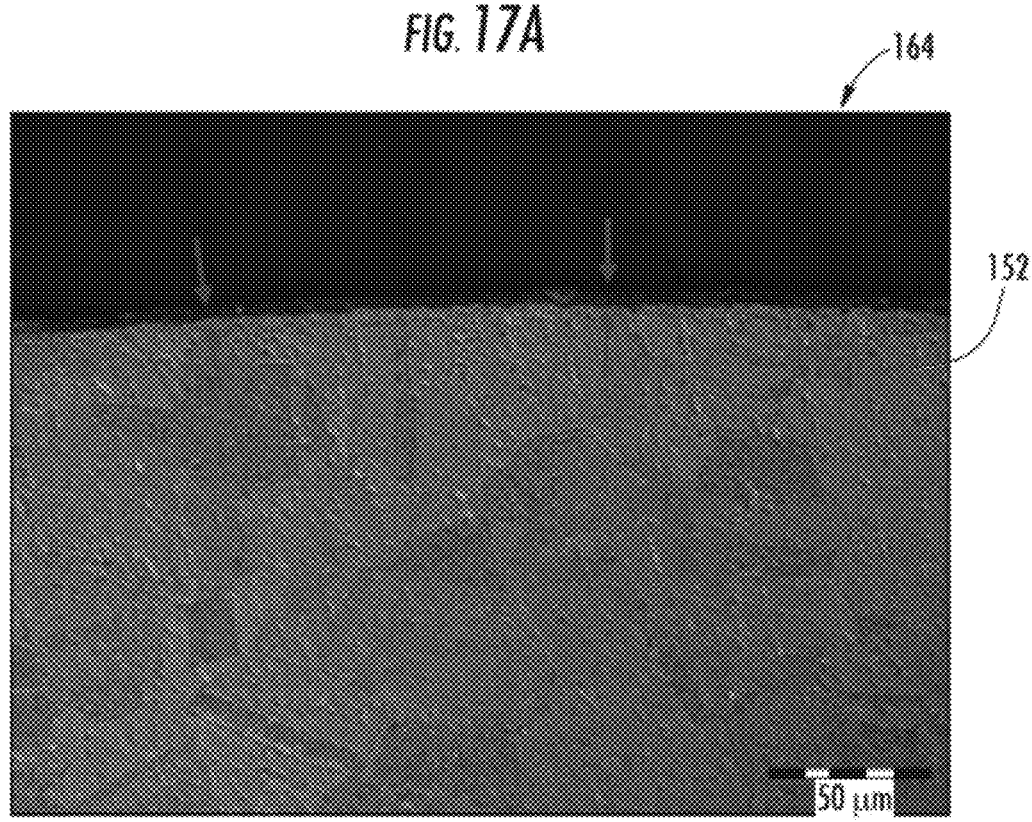

FIG. 15 illustrates the shroud 140 in FIGS. 14A and 14B with a non-stained area 150 and a stained area 152 to analyze the shroud 140 for corrosion susceptibility analysis between these two areas. FIGS. 16A and 16B illustrate energy dispersive x-ray spectroscopy (EDX/EDS) results 154, 156 of the non-stained area 150 and the stained area 152, respectively, of the shroud 140 in FIG. 15 to analyze the shroud 140 for corrosion susceptibility analysis. The X-axis units are energy (keV). The Y-axis units are intensity corresponding to the recorded number of counts detected up by an X-ray detector when the material of the shroud 140 is struck by the electrons generated by an EDX or EDS unit. Based on the analysis, the only recognized difference between the non-stained area 150 and the stained area 152 of the shroud 140 was a slightly elevated oxygen peak 158 in the stained area 152 over an oxygen peak 160 in the non-stained area 150. Significant corrosion susceptibility variation between the non-stained area 150 and the stained area 152 was not observed. FIGS. 17A and 17B illustrate photomicrographs 162, 164 showing the microstructure of the non-stained area 150 and the stained area 152 of the shroud 140 in FIG. 15 for further analysis. The photomicrographs 162, 164 also exhibited that there was no significant change to the microstructure to the outer surface of the shroud 140 between the non-stained area 150 and the stained area 152.

FIG. 18 illustrates a cross-sectional view 166 of the shroud 140 in FIG. 15 for corrosion susceptibility analysis. FIGS. 19A and 19B illustrate energy dispersive X-ray spectroscopy (EDX/EDS) examination results 168, 170 of the non-stained area 150 and the stained area 152, respectively, of the shroud 140 in FIG. 15 for corrosion susceptibility analysis. FIGS. 19A and 19B contain the same axes and units as provided in the results 154, 156 in FIGS. 17A and 17B. Based on the analysis, the only recognized difference between the non-stained area 150 and the stained area 152 of the shroud 140 in the EDX/EDS examination results 168, 170 is a slightly elevated oxygen peak 172 in the stained area 152 over an oxygen peak 174 in the non-stained area 150.

This difference also does not exhibit significant corrosion susceptibility variation between the non-stained area 150 and stained area 152 of the shroud 140.

Figure 20A:
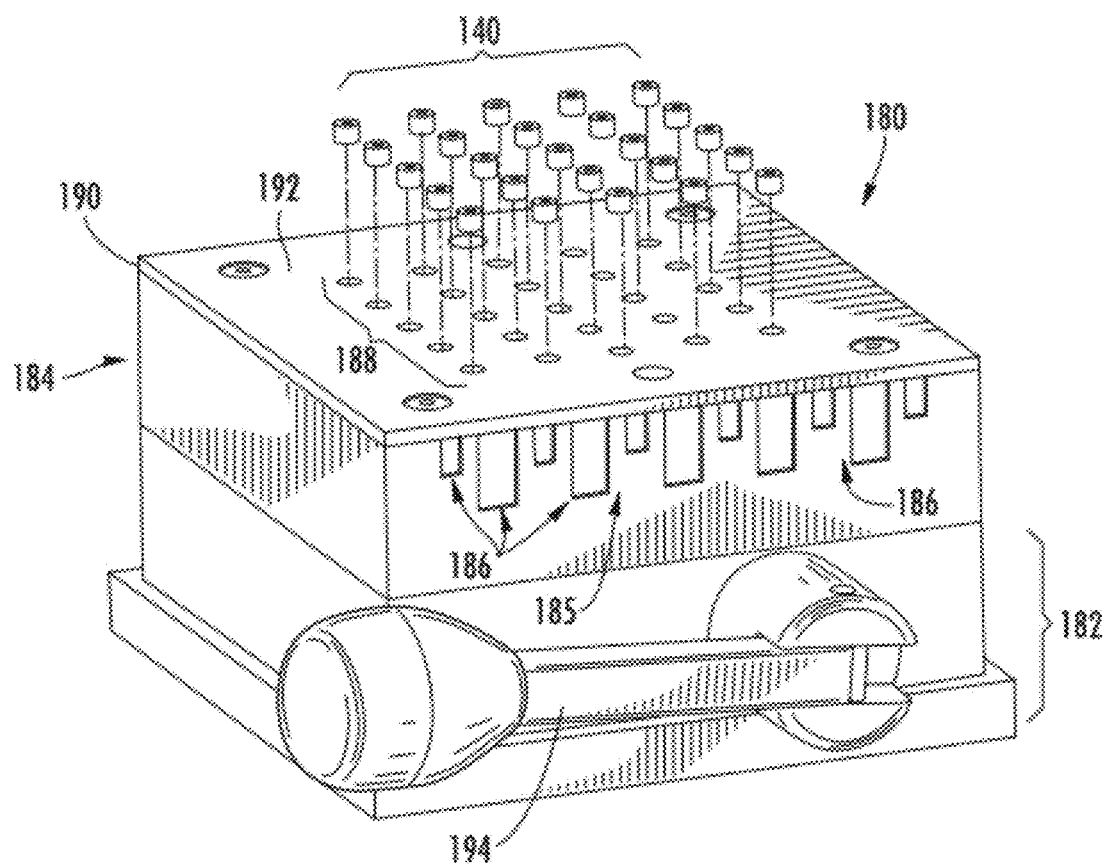
FIGS. 20A and 20B are perspective schematic views of an exemplary magnetic chuck apparatus to allow a plurality of shrouds to be inserted into a machining platform of the magnetic chuck apparatus, retained during an ECM process to dispose slots in the plurality of shrouds simultaneously, and then released from the magnetic chuck apparatus after machining.
Figure 20B:
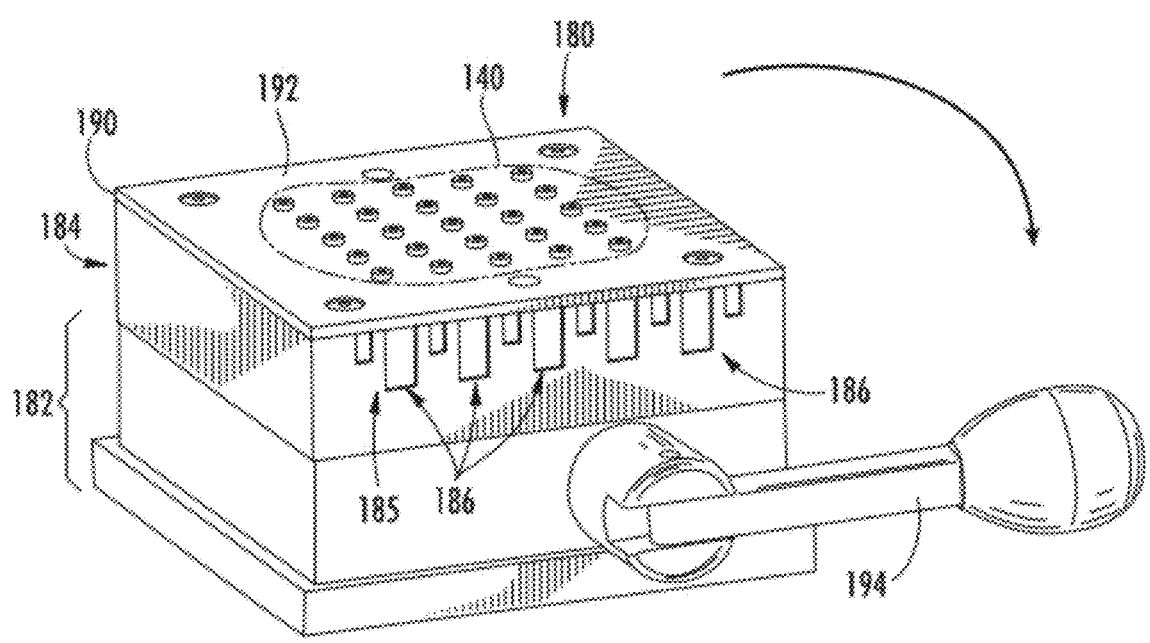

The process and features disclosed herein for ECM are scalable to machine more than one electrically-conductive workpiece at a time. It may be desired to machine more than one electrically-conductive workpiece at a time, including the exemplary shrouds discussed herein, to scale the ECM processes disclosed herein. In this regard, FIGS. 20A and 20B are perspective schematic views of an exemplary magnetic chuck apparatus 180 to allow a plurality of shrouds to be machined using ECM according to one or more embodiments and/or features disclosed herein at the same time. FIG. 20A illustrates a state of the magnetic chuck apparatus 180 when shrouds can be inserted into orifices to be supported prior to machining FIG. 20B illustrates a state of the magnetic chuck apparatus 180 when shrouds are secured prior to machining. For discussion purposes, it will be assumed that the plurality of shrouds machined in the magnetic chuck apparatus 180 at the same time are the shrouds 140 discussed above. However, any type of shrouds or electrically-conductive workpieces can be provided in the magnetic chuck apparatus 180 to be machined according to one or more of the ECM features and embodiments disclosed herein.

With reference to FIGS. 20A and 20B, the magnetic chuck apparatus 180 includes a base 182. An intermediate section 184 is disposed above the base 182. The intermediate section 184 has an interior area 185 comprising a plurality of opposing magnetic poles 186 disposed below a mounting platform 190 disposed above and secured to the intermediate section 184, as illustrated in FIG. 20A. The mounting platform 190 is configured to receive the shrouds 140 through a plurality of openings 188. When an energizer 194 in FIG. 20A is rotated clockwise as illustrated in FIG. 20B, a current is provided to magnetically retain the shrouds 140 prior to machining. The depth of the openings 188 in the mounting platform 190 are configured to allow a portion of the shroud 140 to be disposed about the top surface 192 of the mounting platform 190 for machining using ECM.

If a plurality of the shrouds 140 is machined using an ECM process, it may be desirable to provide an electrode that is configured to machine the multiple shrouds 140 at the same time. For example, such an electrode would be needed to employ the magnetic chuck apparatus 180 in FIGS. 20A and 20B to machine multiple shrouds 140 at the same time. In this regard, FIGS. 21A-21C are top perspective, close-up top perspective, and close-up bottom perspective views, respectively, of one exemplary electrode 200 that may include any of the features described herein and that may be employed in an ECM apparatus, such as the ECM apparatus 64 in FIGS. 5A and 5B, to machine slots in a plurality of shrouds simultaneously.

As illustrated in FIG. 21A, the electrode 200 is comprised of an electrically-conductive body 202. The electrically-conductive body 202 may have the material properties of the electrode 66. A plurality of elongated members 204, 206 are disposed in the electrode 200 extending between the conductive body 202 to form intersections 208 of the elongated members 204, 206 to form electrically-conductive pins 210 in a honeycomb grid pattern so that multiple shrouds can be machined using ECM at the same time. The break lines in the electrode 200 in FIG. 21A are to signify that any number of elongated members 204, 206 desired can be provided. Each intersection 208 of the elongated members 204, 206 can be aligned with the center of a shroud 140 such that the electrically-conductive pins 210 will be located above the shroud 140 to machine slots in the shroud 140. All other features and techniques previously described above, including without limitation, providing tapering of the electrically-conductive pins 210 and dielectric layers with end faces of the electrically-conductive pins 210 exposed can be provided in the electrode 200.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An electrochemical machining (ECM) apparatus for machining an electrically-conductive workpiece, comprising:
   an electrode;
   an electrode translation device configured to locate the electrode relative to an electrically-conductive workpiece to be machined;
   an electrode controller configured to control the electrode translation device to oscillate the electrode between a first distance from the electrically-conductive workpiece and a gap distance from the electrically-conductive workpiece and to maintain a gap between the electrode and the electrically-conductive workpiece when the electrode is located at the gap distance from the electrically-conductive workpiece;
   a circulator system configured to circulate an electrolyte into the gap between the electrode and the electrically-conductive workpiece;
   a controllable power supply electrically connected to an electrically-conductive workpiece and the electrode, the controllable power supply configured to supply a power pulse to the electrically-conductive workpiece and the electrode when the electrode is disposed at the gap distance from the electrically-conductive workpiece; and
   a resistive feedback loop that is configured to sense a resistance of the electrically-conductive workpiece and communicate the resistance of the electrically-conductive workpiece to the electrode controller,
   wherein the electrode controller is configured to adjust the oscillation of the electrode based upon the resistance of the electrically-conductive workpiece in order to maintain the gap distance as material is removed from the electrically-conductive workpiece,
   wherein the electrode includes an electrically-conductive body and a plurality of electrically-conductive pins extending from the body, each of the pins including a first end adjacent to the body and a second end that is spaced apart from the body, the second ends of each of the pins are spaced apart from each other, the second ends of the pins form a distal end of the electrode that defines the gap distance, wherein an outer periphery of the first end of one of the pins includes a tapered cross-sectional shape so that the second end has a second width that is different than a first width of the first end, each of the pins includes a shaft portion extending between the tapered cross-sectional shape and the second end, the shaft portion having a smaller width than the tapered cross-sectional shape, the pins are configured to remove material from the workpiece such that each pin forms a slot in the workpiece.

2. The ECM apparatus of claim 1, wherein the controllable power supply is configured to not supply a power pulse to the electrically-conductive workpiece and the electrode when the electrode is not disposed at the gap distance from the electrically-conductive workpiece.

3. The ECM apparatus of claim 1, wherein the electrode controller is configured to oscillate the electrode at an oscillation rate between 40 Hertz (Hz) and 60 Hz.

4. The ECM apparatus of claim 1, wherein the controllable power supply is configured to supply the power pulse for a duration between 1.5 and 2.0 milliseconds (ms).

5. The ECM apparatus of claim 1, wherein the electrically-conductive workpiece is comprised of an electrically-conductive shroud.

6. The ECM apparatus of claim 1, further comprising a sacrificial post disposed in an opening of the electrically-conductive workpiece.

7. The ECM apparatus of claim 1, wherein the electrode controller is configured to control the electrode translation device to control a downward feed rate of the electrode into the electrically-conductive workpiece.

8. The ECM apparatus of claim 7, wherein the downward feed rate of the electrode is between 0.03 and 0.07 millimeters per minute (mm/min).

9. The ECM apparatus of claim 1, wherein the first width is fifty percent (50%) or less of the second width.

10. The ECM apparatus of claim 1, wherein the at least one electrically-conductive pin is comprised of at least one electrically-conductive wire.

11. The ECM apparatus of claim 1, further comprising at least one dielectric layer that forms a surface of the electrically-conductive body and the at least one electrically-conductive pin.

12. The ECM apparatus of claim 11, wherein at least one dielectric layer is comprised of Parylene, an amorphous carbon, a growth of non-conductive oxides through anodizing, and heat treatments.

13. The ECM apparatus of claim 11, wherein the at least one dielectric layer has a thickness of less than eleven (11) micrometers (µm).

14. The ECM apparatus of claim 11, wherein the at least one dielectric layer does not cover the end face of the at least one electrically-conductive pin.

15. The ECM apparatus of claim 1, wherein the plurality of electrically-conductive pins are spaced around a circumference on an end of the electrically-conductive body.

16. The ECM apparatus of claim 15, further comprising a void disposed between adjacent electrically-conductive pins among the plurality of electrically-conductive pins.

17. The ECM apparatus of claim 1, further comprising at least one chamber disposed through the electrically-conductive body in fluid communication with an end of electrically-conductive body.

18. The ECM apparatus of claim 1, wherein the electrode is comprised of a plurality of electrically-conductive materials disposed in a grid pattern.

* * * * *